United States Patent [19]

Theis et al.

[11] Patent Number: 4,856,050

[45] Date of Patent: Aug. 8, 1989

[54] TELEPHONE MESSAGE RETRIEVAL SYSTEM WITH IMPROVED MESSAGE PROCESSOR AND RETRIEVAL CONSOLE INCLUDING AUTO-DISABLING PLAYBACK SWITCH

[76] Inventors: Peter F. Theis, 3203 Bay View La., McHenry, Ill. 60050; Gregory Buchberger, 500 Huntington Commons Rd., Mt. Prospect, Ill. 60056

[21] Appl. No.: 98,017

[22] Filed: Sep. 17, 1987

Related U.S. Application Data

[62] Division of Ser. No. 574,880, Jan. 30, 1984, Pat. No. 4,719,647.

[51] Int. Cl.$^4$ ............................................. H04M 1/64
[52] U.S. Cl. ....................................... 379/68; 369/29; 379/84
[58] Field of Search ...................... 369/28, 29, 19, 25; 379/68-70, 73, 75, 77, 78, 84, 63, 67; 360/74.1, 74.4

[56] References Cited

U.S. PATENT DOCUMENTS

| | | | |
|---|---|---|---|
| 3,532,835 | 10/1970 | Nakayama et al. | 360/74.4 |
| 3,588,376 | 6/1971 | Jeske et al. | 369/25 X |
| 3,609,245 | 9/1971 | Richter | 379/84 X |
| 3,691,313 | 9/1972 | Kobayashi et al. | 360/74.4 |
| 3,935,389 | 1/1976 | Waldman | 379/77 |
| 4,015,090 | 3/1977 | Kitada | 379/70 X |
| 4,059,732 | 11/1977 | Hayden et al. | 379/67 X |
| 4,093,831 | 6/1978 | Sharp et al. | 369/25 X |
| 4,150,255 | 4/1979 | Theis et al. | 379/84 |
| 4,256,443 | 1/1981 | Smith | 379/63 |
| 4,319,337 | 3/1982 | Sander et al. | 369/29 X |
| 4,338,494 | 7/1982 | Theis | 369/29 X |
| 4,469,919 | 9/1984 | Nakamura et al. | 379/73 |
| 4,488,274 | 12/1984 | Plunkett, Jr. | 369/29 X |
| 4,500,753 | 2/1985 | Plunkett, Jr. | 379/70 |
| 4,628,390 | 12/1986 | Motoyama et al. | 369/25 X |

FOREIGN PATENT DOCUMENTS 2140250 11/1984 United Kingdom .

OTHER PUBLICATIONS

Tandy Corporation, "Radio Shack-1984 Catalog", 1983, p. 34.
TC11-002G-101 Automatic Call Distributors—Products and Specifications, 1983 DataPro Research Corporation, Delran, NJ (Automatic Call Distribution Systems).
TC41-007E-101 Voice Store-and-Forward Systems, 1983 Data Pro Research Corporation, Delran, NJ (Specialized Systems and Services).

*Primary Examiner*—Alan Faber
*Assistant Examiner*—W. R. Young
*Attorney, Agent, or Firm*—Willian Brinks Olds Hofer Gilson & Lione

[57] ABSTRACT

A message retrieval system is disclosed which includes a plurality of answering machines, each connected to respected telephone line. Each answering machine records telephone responses on a respective message memory unit and all message memory units are connected to a single message processor. The message processor is in turn connected to a number of retrieval consoles used by operators to transcribe messages from the message memory units. The message processor operates (1) to automatically switch the mode of a headset included in the retrieval console between a transcription mode and a dialog mode to allow an operator either to transcribe messages or to conduct live telephone conversations via the same headset; (2) to allow a console to place a commanded message memory unit on hold while live telephone conversations are being conducted; (3) to disconnect a commanded message memory unit from a console in the event the console fails to command the message memory unit within a predetermined time; (4) to take positive action in the event recorded messages on one of the message memory units age excessively prior to transcription; and (5) to prevent a single operator closure of a switch or footpedal on the retrieval console from causing more than a preselected amount of transcription or rewinding of the message memory unit.

3 Claims, 18 Drawing Sheets

TELEPHONE MESSAGE RETRIEVAL SYSTEM WITH IMPROVED MESSAGE PROCESSOR AND RETRIEVAL CONSOLE INCLUDING AUTO-DISABLING PLAYBACK SWITCH

This is a division, of application Ser. No. 574,880, filed Jan. 30, 1984, now U.S. Pat. No. 4,719,647, issued Mar. 2, 1989.

BACKGROUND OF THE INVENTION

The present invention relates generally to telephone message recording and transcribing systems, and in particular to an improved message retrieval system for use with a telephone answering system which includes a plurality of telephone answering machines and a plurality of message memory units coupled to the answering machines.

Telephone answering systems are routinely used to enable operating personnel to service a large number of callers. Such systems include a plurality of answering machines coupled to telephone lines. These answering machines deliver prerecorded messages after seizing a line and record caller responses on a message memory unit such as an endless loop tape recorder. Operators then transcribe the recorded messages on the message memory units and take appropriate action. For example, an operator may call back a caller who has left a telephone number and a request.

U.S. Pat. No. 4,338,494 discloses a microprocessor-controlled telephone call inventorying and sequencing system. This system records priority information (such as the time of recording of a message) along with the stored messages in the message memory unit. The microprocessor uses this stored priority information to select which of the message memory units is to be interconnected with a transcribing station requesting transcription. The selection criteria are chosen to prevent stored messages on any particular message memory unit from being delayed excessively in transcription. The system disclosed in the above identified patent operates automatically to disconnect a message memory unit from a transcribing station if the message memory unit has not been transcribed from in a predetermined period, such as 60 seconds. In this way, the system prevents an inactive transcribing station from monopolizing a message memory unit.

Our previous U.S. Pat. No. 4,150,255 discloses a conversational telephone call distributor which utilizes a manually controlled distribution panel to interconnect operator stations with selected message recorders.

In spite of the many advantages offered by the systems described above, a need presently exists for an improved message retrieval system which provides improved protection against operator abuse of the system or the callers, improved flexibility by which an operator can both transcribe recorded messages and respond to live telephone calls, and which takes positive action to prevent stored messages from being delayed excessively in transcription.

SUMMARY OF THE INVENTION

According to this invention, an improved message retrieval system is provided which provides important advantages in terms of safeguards against operator error, safeguards against excessive delays in message transcription, and improved operator convenience.

According to a first feature of this invention, a retrieval console is provided in a message retrieval system of the type generally described above. This retrieval console can be switched between a message transcription mode in which stored messages can be transcribed, and a dialog mode in which the operator of the console can conduct conversations via a telephone line. A single speaker, such as a headset or handset, is provided for the operator, and the system operates automatically to interconnect the retrieval console with one of the message memory units to allow stored messages to be transcribed by the operator and heard on the speaker means of the retrieval console when the console is in the message transcription mode. Similarly, when the retrieval console is in the dialog mode the speaker means is automatically interconnected with a telephone line such that the operator can conduct a conversation on the telephone line using the same speaker means as that used in the transcription of stored messages. By automatically changing the mode of the speaker means to maintain it in correspondence with the mode of the retrieval console, the need for an operator to change headsets, switch signal inputs to a headset, wear multiple headsets, or have an external speaker is completely eliminated. In this way, operator efficiency is increased.

According to a second feature of this invention, a dual mode retrieval console is provided which can be used either to transcribe stored messages from one of the message memory units or to conduct conversations on a telephone line. A message processor is interconnected between the retrieval console and the message memory units. This message processor operates to interconnect each of the retrieval consoles with respective selected ones of the message memory units to permit each of the retrieval consoles when in the message transcription mode to command playback of stored messages from the interconnected message memory unit and to ensure that each of the message memory units is connected to no more than one of the retrieval consoles at a time. In addition, this message processor operates in the event one of the retrieval consoles is switched to the dialog mode while interconnected with one of the message memory units to prevent the interconnected one of the message memory units from being interconnected with another of the retrieval consoles while the one of the retrieval consoles is in the dialog mode. With this feature of the invention an operator transcribing a stored message can easily switch to the dialog mode when necessary to conduct a telephone conversation without losing control of the interconnected message memory unit. Then, when the telephone conversation is completed, the operator can return to the interrupted transcription.

In order to prevent undesired monopolization of a message memory unit while an operator is using a retrieval console in the dialog mode, the message processor preferably operates to disconnect a message memory unit from a retrieval console in the event the retrieval console fails to command activity of the respective message memory unit within a predetermined time interval. In the preferred embodiment described below, the message processor activates a warning alarm on the retrieval console prior to disconnecting the retrieval console from the message memory unit in order to allow the operator to take action to preserve the connection with the message memory unit.

According to another feature of this invention, a message retrieval system of the type generally described above is provided with means for monitoring a parameter indicative of the age of messages stored in message memory units and for automatically generating an alarm signal in the event the parameter exceeds a threshold indicative of excessive delays between the time of recording and the time of playback of messages stored in the message memory unit. In addition, means are provided for modifying the system in response to the alarm signal to adapt the system to excessive delays between message recording and playback. For example, in the preferred embodiment described below, the modifying means operates to prevent further messages from being recorded on a message memory unit until the excessively old messages have been transcribed. In this way, excessive callback delays are avoided.

Yet another feature of this invention relates to the manner in which operator control of a message memory unit is limited in order to prevent misuse of the system. According to this feature of the invention, at least one retrieval console is provided in a message retrieval system and is coupled to the message memory units to permit an operator at the retrieval console to transcribe messages stored on the message memory units. This retrieval console comprises at least one forward switch operative to generate a playback command to cause one of the message memory units to play back a stored message in a forward direction. Means are provided for preventing a single activation of the forward switch from causing a selected one of the message memory units from playing back a stored message for more than a first preselected time interval. In this way, an operator cannot through inadvertence or intention simply let messages be played out without transcription through a single activation of the forward switch. Rather, the operator must take repetitive actions to maintain message playback. In the preferred embodiment described below, the retrieval console further includes at least one reverse switch operative to generate a rewind command to cause the respective message memory unit to rewind a stored message in a reverse direction, and the invention further comprises means for preventing a single activation of the reverse switch from causing a selected one of the message memory units from rewinding for more than a second preselected time interval. This feature of the invention makes it significantly less likely that an operator will accidentally or inadvertently go back to much earlier messages that have already been transcribed and thereby duplicate information already entered for processing.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Turning now to the drawings, FIG. 1-14e provide various diagrams and flowcharts of a message retrieval system 20 which incorporates a presently preferred embodiment of this invention. The following discussion will treat first the hardware, then the software, and finally the operation of this system.

A.

SYSTEM HARDWARE

Figure 1:
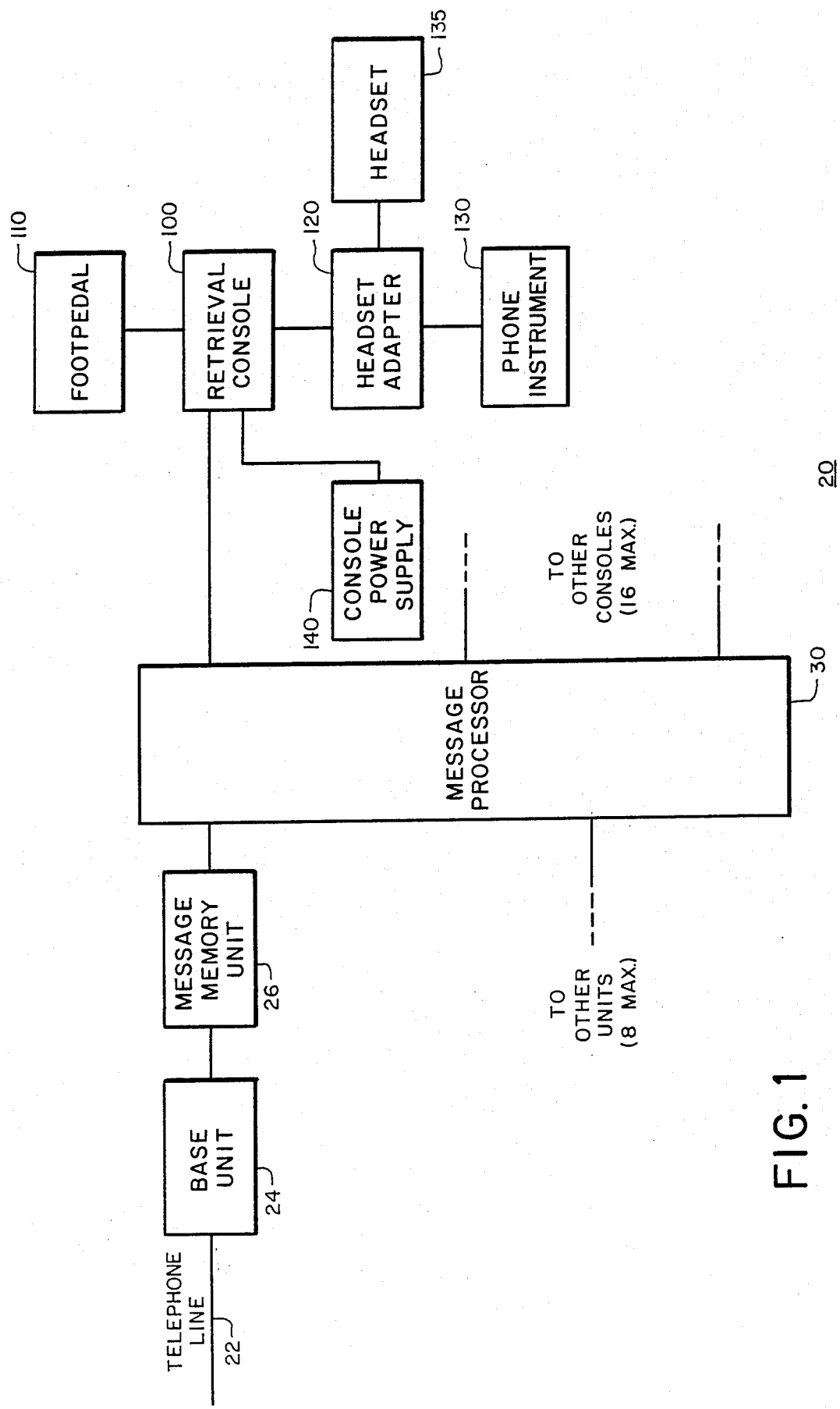
FIG. 1 is a block diagram of a message retrieval system which incorporates the presently preferred embodiment of this invention.

As shown in FIG. 1, the message retrieval system 20 includes a message processor 30 which is connected to a maximum of eight message memory units 26 in this preferred embodiment. Each of the message memory units 26 is connected to a respective base unit 24, and each of the base units 24 is connected to a respective telephone line 22. The base units 24 are telephone answering machines which answer calls on the telephone lines 22, deliver prerecorded messages, and then record the telephone responses on the message memory units. The message memory units (MMU's) 26 are in this preferred embodiment endless loop tape recording machines having separate record and transcribe magnetic heads. This invention is not directed per se to the structure of operation of the base units 24 or the MMU's 26. These components are well known to those skilled in the art and will not be described in greater detail here. For example, the disclosure of U.S. Pat. No. 4,338,494 describes telephone answering machines and MMU's which are suitable for use as the components 24,26 of this embodiment. Alternatively, the MMU's 26 may be embodied as solid state recording devices.

The message processor 30 is in turn connected to a maximum of sixteen retrieval consoles 100. Each of the retrieval consoles 100 is powered by a power supply 140, and each of the retrieval consoles 100 is accompanied by a foot pedal 110 and a telephone instrument 130, and a headset or a handset 135, which is connected to the console 100 via a headset adaptor 120.

The general operation of the message retrieval system 20 is that the base units 24 serve to record telephone messages on the individual MMU's 26. Operators at the retrieval consoles 100 are connected by the message processor 30 with operator-selected ones of the MMU's 26. Once connected, an operator can use the retrieval console 100 to rewind or transcribe from the connected MMU 26 in order to audit or transcribe stored messages from the MMU 26. The operator hears the audited messages via the headset or handset 135. Once a message has been transcribed, the operator will then typically take appropriate action, such as calling back the caller who left the message on the MMU.

Figure 2:
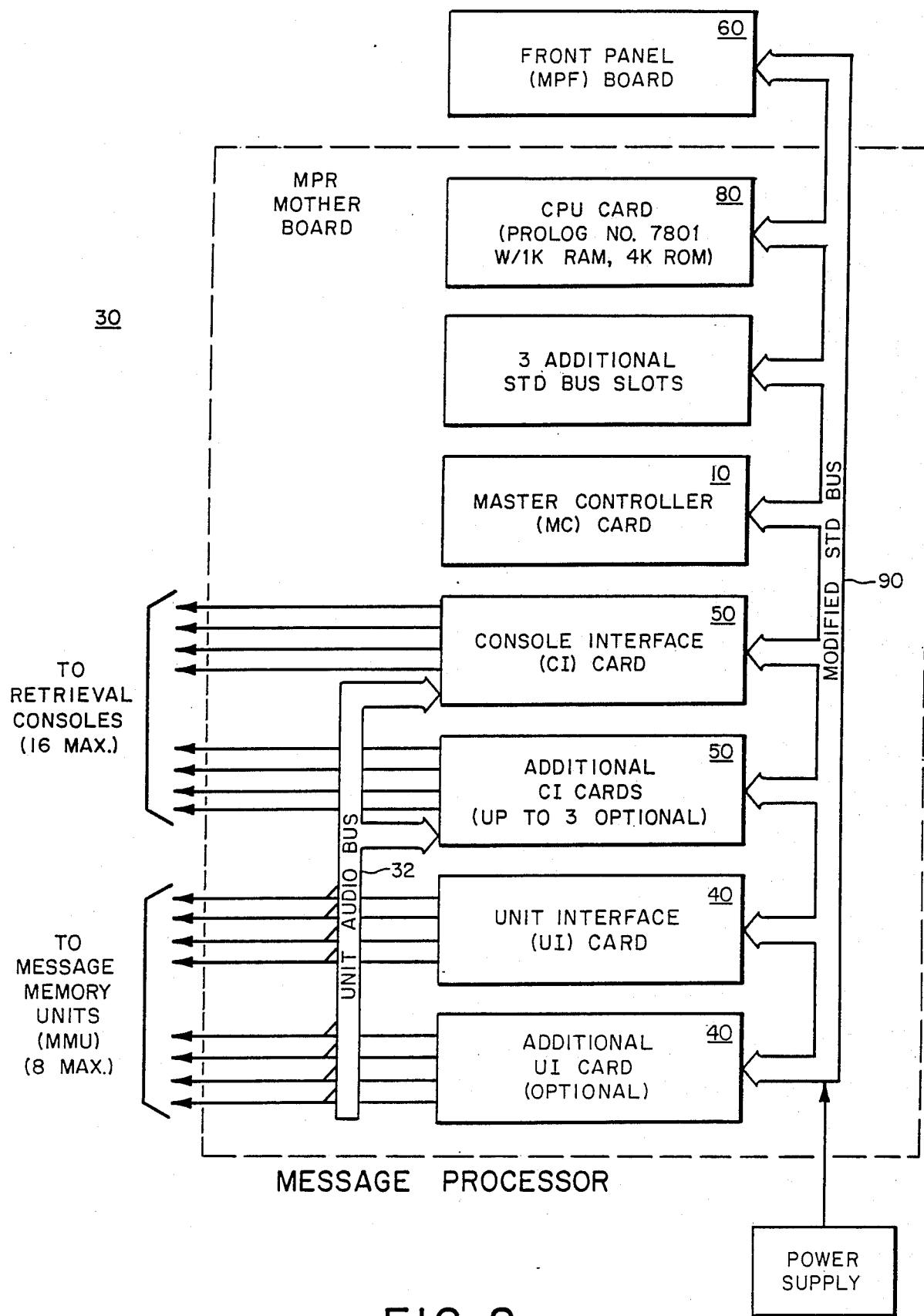
FIG. 2 is a block diagram of the message processor of FIG. 1.

As shown in FIG. 2, the message processor 30 is a computer-based system which in this preferred embodiment is made up of a number of separate circuit cards interconnected by a bus 90. The message processor 30 includes a CPU Card 80, such as that marketed by Prolog as Part No. 7801, which includes a microprocessor with 1K of random access memory and space for 8K of read only memory. The microprocessor of the CPU Card 80 is interfaced with the MMU's 26 via one or more Unit Interface Cards 40. Similarly, the CPU Card 80 is interfaced with the retrieval consoles 100 by one or more Console Interface Cards 50. A Front Panel Board 60 is provided to allow entry of certain parameters, and a Master Controller Card 70 is provided to allow serial I/O transmission between the message processor 30 and the retrieval consoles 100. FIGS. 3-6 provide detailed block diagrams of the Unit Interface Card 40, the Console Interface Card 50, the Front Panel Board 60 and the Master Controller Card 70.

Figure 3:
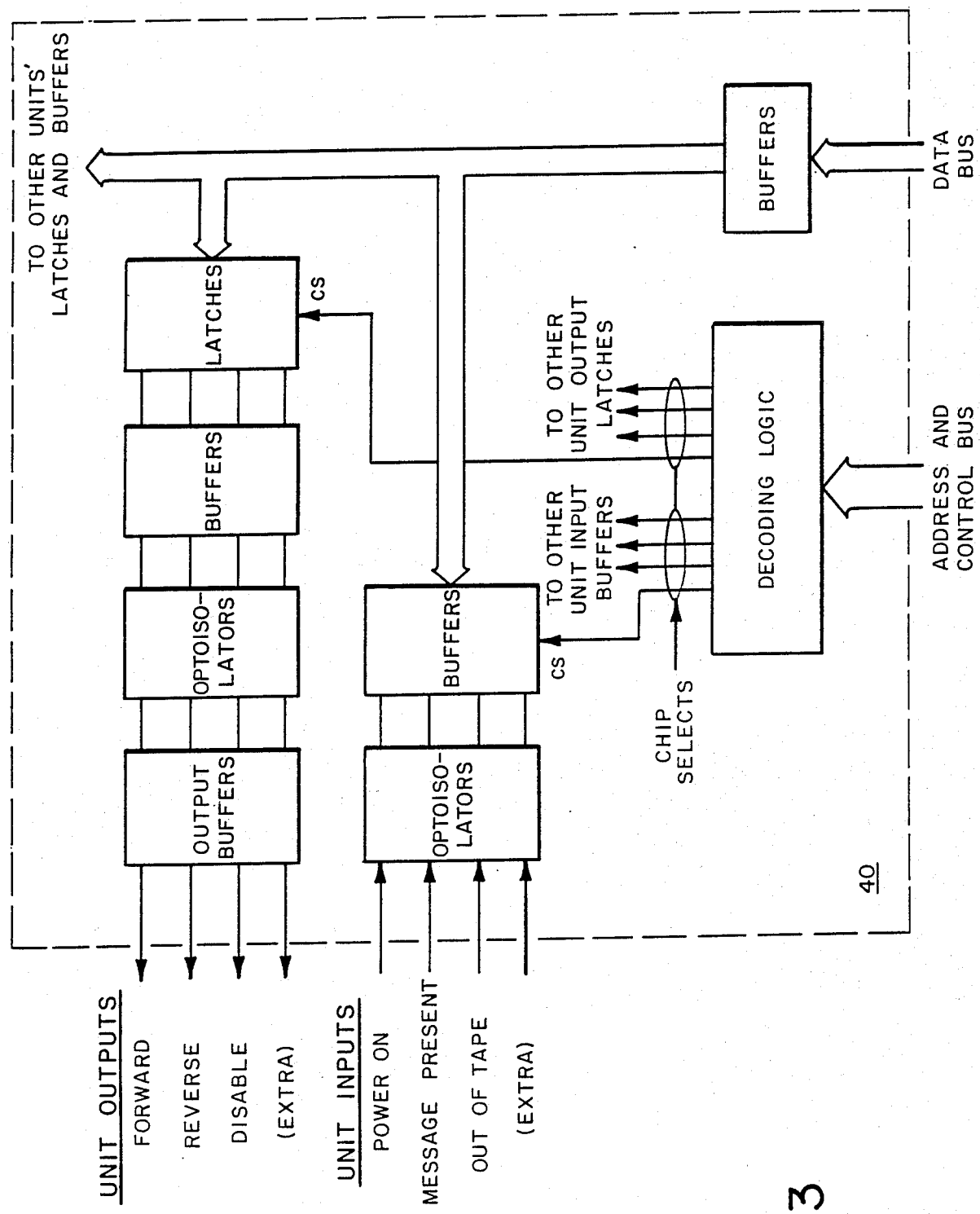
FIG. 3 is a block diagram of the Unit Interface Card of FIG. 2.

FIG. 3 shows a block diagram of one of the Unit Interface Cards 40. Each of the Unit Interface Cards 40 communicates with the remainder of the message processor 30 via the bus 90. Each of the MMU's 26 serviced by a particular Unit Interface Card 40 provides three input signals: POWER ON, MESSAGE PRESENT, and OUT OF TAPE. The POWER ON input indicates whether the respective MMU is powered. The MESSAGE PRESENT input indicates whether the respective MMU 26 has recorded a message which is ready to be transcribed. The OUT OF TAPE input indicates whether the respective MMU 26 has recorded messages on all available tape and is therefore unable to record additional messages.

In addition, the Unit Interface Card 40 provides three output signals to each of the MMU's 26 controlled by the card 40: FORWARD, REVERSE, and DISABLE. The FORWARD command causes the associated MMU 26 to transcribe stored messages in a forward direction. The REVERSE command causes the respective MMU 26 to move tape past the transcription head in a reverse direction, i.e., to back up the tape. The DISABLE command prevents the associated MMU 26 from recording additional messages. The Unit Interface Card 40 provides appropriate buffers and latches so as to interface these three inputs and three outputs of each of the MMU's 26 with the remainder of the message processor 30.

Figure 4:
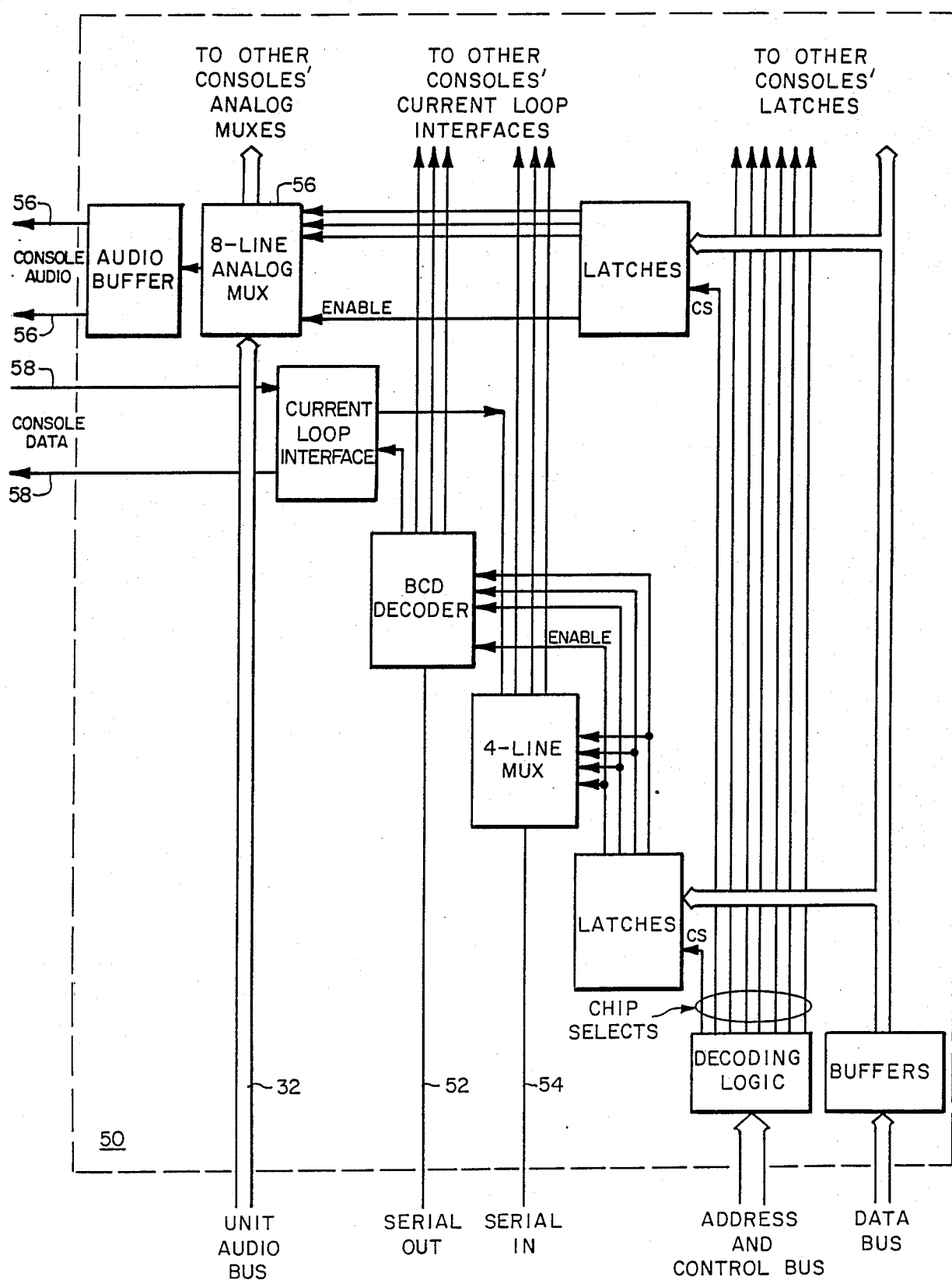
FIG. 4 is a block diagram of the Console Interface Card of FIG. 2.

FIG. 4 shows a block diagram of one of the Console Interface Cards 50. Each of the Console Interface Cards communicates with the remainder of the message processor 30 via the bus 90. In addition, each Console Interface Card 50 receives audio signals from each of the message memory units 26 via a unit audio bus 32. Serial I/O communications between the Console Interface Cards 50 and the remainder of the message processor 30 are accomplished via serial out and serial in data paths 52,54, respectively. The Console Interface Card 50 includes an analog multiplexer 55 which can be controlled by the CPU card 80 to direct analog signals from any one of the MMU's 26 to the associated retrieval console 100 via console audio conductors 56. Similarly, the Console Interface Card interfaces the serial transmission of binary data via the console data conductors 58.

Figure 5:
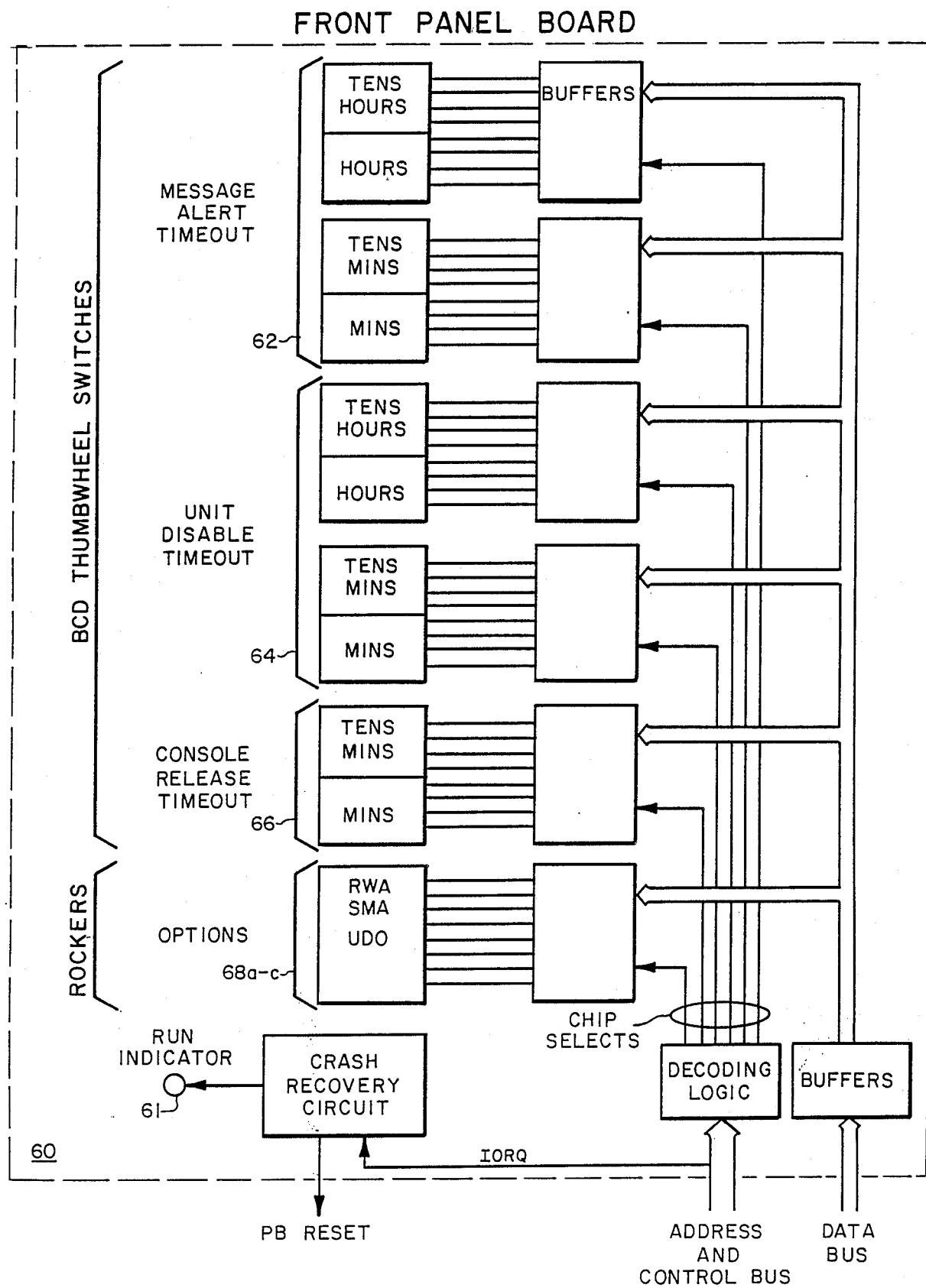
FIG. 5 is a block diagram of the Front Panel Board of FIG. 2.

FIG. 5 shows a block diagram of the Front Panel Board 60. The Front Panel Board 60 includes three sets of thumbwheel BCD switches 62,64,66. The switches 62 can be used to enter any number between zero and 99 hours, 99 minutes as a Message Alert Timeout (MAT) threshold described below. Similarly, the switches 64 can be used to manually enter any number between zero and 99 hours, 99 minutes as a Unit Disable Timeout (UDT) threshold as described below. The switches 66 can be used to enter any number between zero and 99 minutes as a Console Release Timeout (CRT) threshold. In addition, the Front Panel Board 60 includes three rocker switches 68a,68b,68c used to enter three binary control options (Release Warning Audible (RWA), Stop Motion Audible (SMA), the Unit Disable Override (UDO) as described below). The Front Panel Board 60 also includes a run indicator 69 which visually indicates whether or not the message processor 30 is powered and its program is running.

Figure 6:
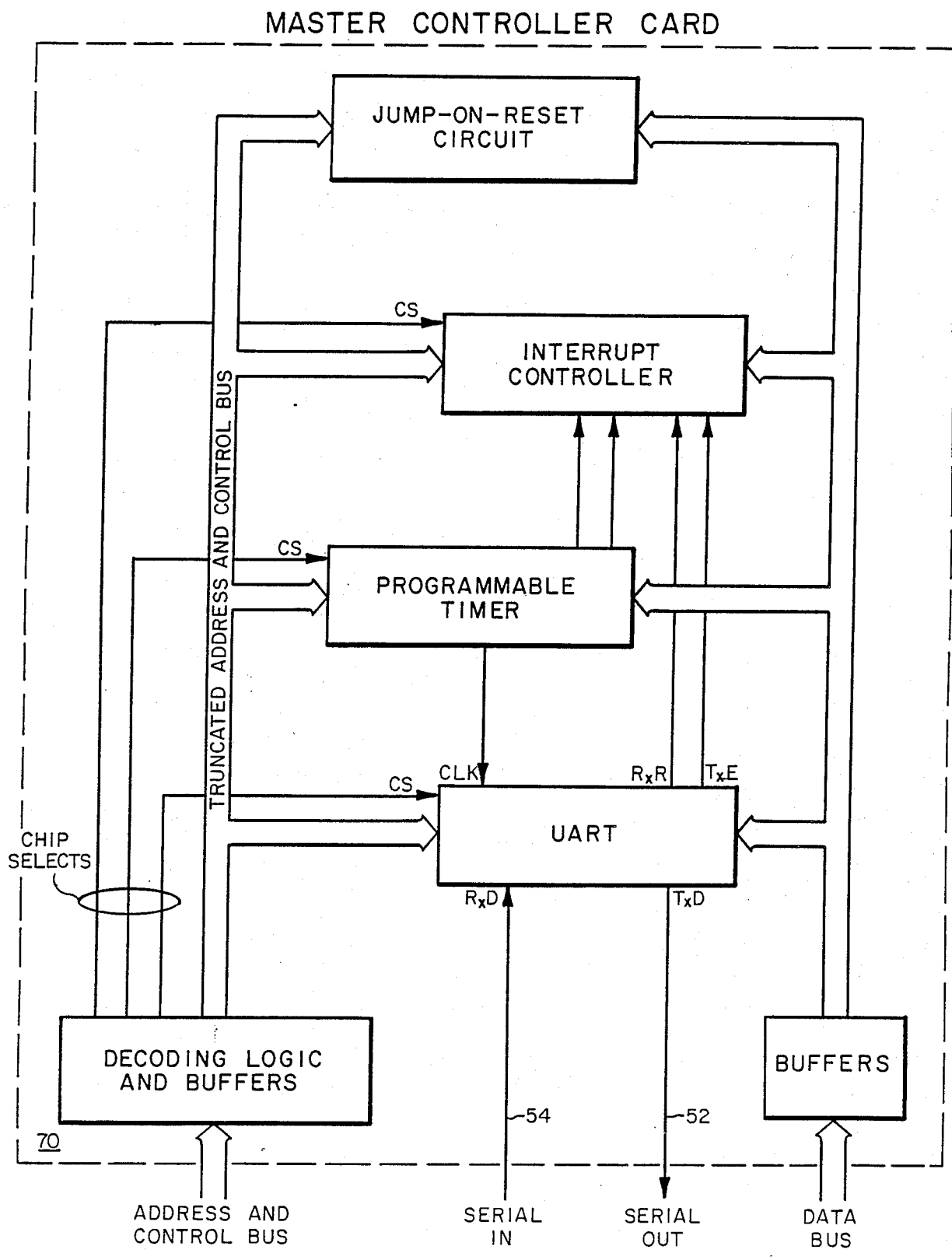
FIG. 6 is a block diagram of the Master Controller Card of FIG. 2.

FIG. 6 shows a block diagram of the Master Controller Card 70. The Master Controller Card 70 includes a UART circuit which accomplishes serial data transfer via the serial data paths 52, 54 in cooperation with the Console Interface Card 50. The UART circuit is a conventional prior art serial I/O controller familiar to those skilled in the art. In addition, the Master Controller Card includes a conventional jump-onreset circuit, an interrupt controller circuit, and a programmable timer circuit to perform the functions described below.

Figure 7:
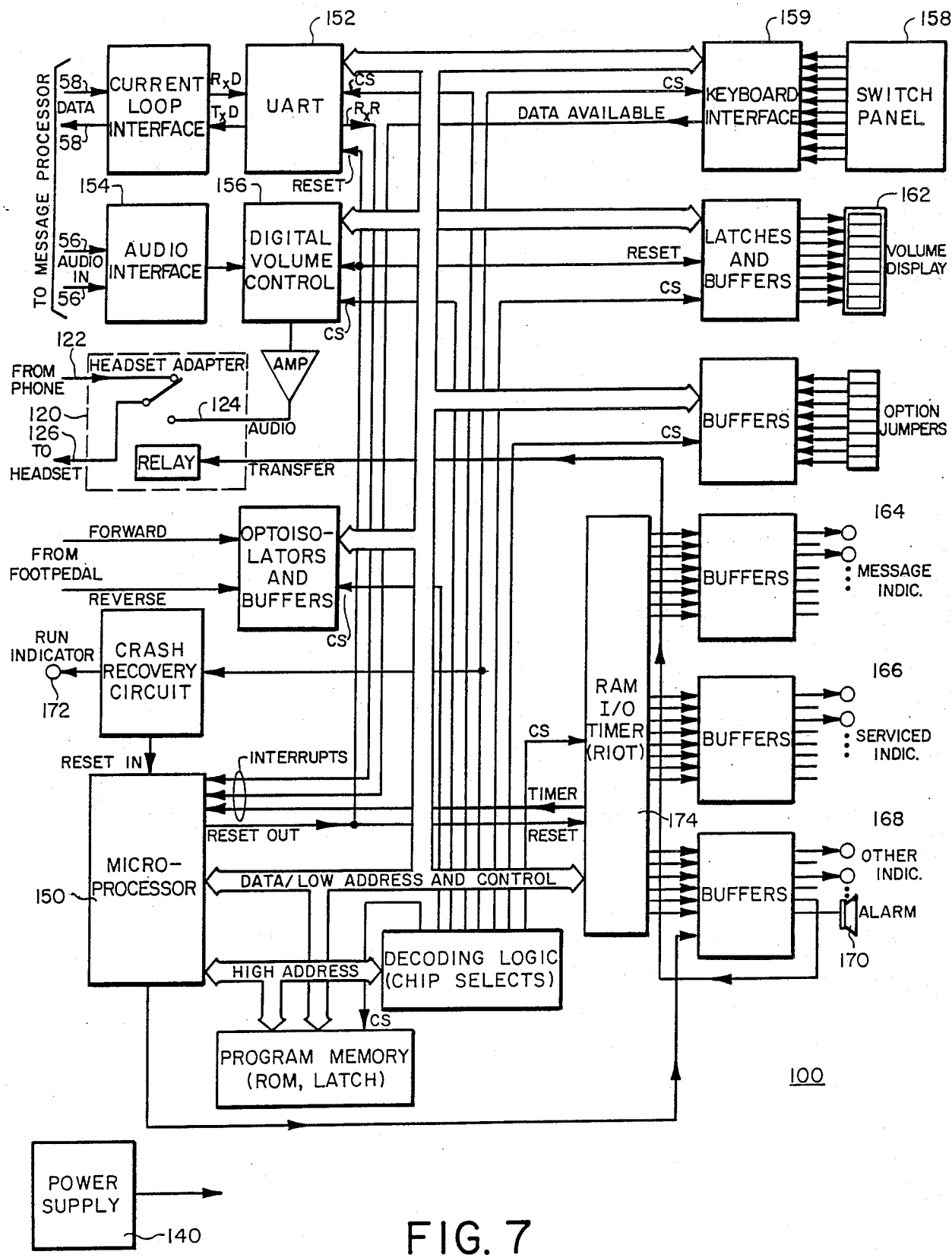
FIG. 7 is a block diagram of the retrieval console of FIG. 1.

FIG. 7 shows a block diagram of one of the retrieval consoles 100. As shown in FIG. 7, each of the retrieval consoles 100 includes a microprocessor 150 which controls the console. Serial data transmission via the console data conductors 58 is controlled via a UART 152, and audio signals transmitted by the message processor 30 via the console audio conductors 56 are processed by audio interface circuit 154 and a digital volume control 156. The audio output of the digital volume control 156 is applied via an amplifier to an audio conductor 124.

The headset adapter 120 includes a relay which is controlled to interconnect the audio conductor 124 with the headset via line 126 automatically when the retrieval console 100 is being used to transcribe messages from one of the MMU's 26. In addition, the headset adapter 120 receives an audio signal from the telephone instrument 130 via line 122. The relay of the headset adapter 120 is controlled to automatically break the connection between the conductor 126 and the conductor 124 when the retrieval console 100 is used to conduct telephone conversations via the line 122 and to connect the lines 122,126 automatically.

The retrieval console 100 includes a switch panel 158 which generates binary signals that are applied as inputs via a keyboard interface circuit 159 to the microprocessor 150. Similarly, the foot pedal 100 provides input signals via the conductors 160 which are passed via appropriate optoisolators and buffers to the microprocessor 150. An eight-segment volume display 162 is controlled by the microprocessor 150 to indicate the volume level currently selected at the retrieval console 100. A total of eight message indicators 164 and a total of eight serviced indicators 166, as well as an array of additional indicators 168, are also controlled via I/O ports included in the RIOT 174. An audio alarm 170 is similarly driven by signals generated at an I/O port of the RIOT 174. It should be understood that the RIOT 174 is a conventional prior art device which includes random access memory, a plurality of parallel input/output ports, and a programmable timer. Such devices are well known to those skilled in the art and will not therefore be described in greater detail here. A run indicator 172 provides a visual indication of the status of the retrieval console 100.

Figure 8:
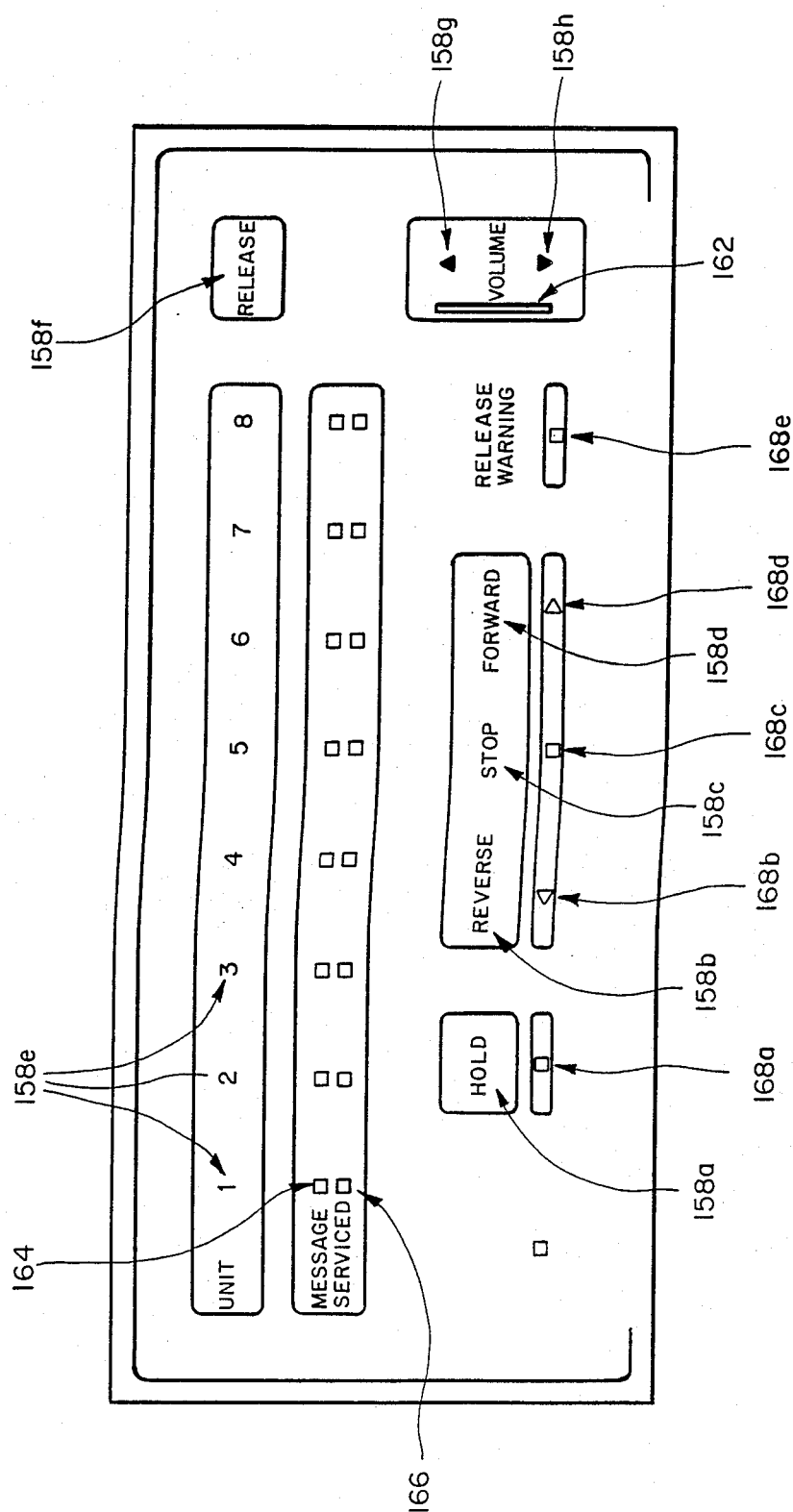
FIG. 8 is a plan view of the front panel of the retrieval console of FIG. 7.

FIG. 8 shows a plan view of the console panel 180 of the retrieval console 100. For each of the eight possible MMU's 26 this console panel 180 includes a respective unit selection switch 158e, a respective message indicator 164, and a respective serviced indicator 166. In addition, the console panel 180 includes manually actuated switches and displays which control and indicate the following functions: Hold (158a,168a), Reverse (158b,168b), Stop (158c,168c), Forward (158d,168d). A release warning indicator 168e is provided along with a release switch 158f. The volume controls 158g,158h can be used to raise or lower the volume of the audio signal on the headset or handset 135, and the eight-segment visual display 162 indicates the requested volume level. Indicators 168a–168e are included in indicators 168 of FIG. 7, and switches 158a–158h are included in the switch panel 158 of FIG. 7.

In this preferred embodiment, the retrieval console 100 is housed in an internally metalized plastic case; it includes a plastic graphics panel; and the input switches are static-shielded membrane switches. The graphics panel defines windows for the various indicators which in this preferred embodiment are LED's.

B.

SYSTEM SOFTWARE

As explained above, both the message processor 30 and each of the retrieval consoles 100 includes a respective programmed microprocessor. The following discussion will take up first the program for the message processor 30 and then the program for the retrieval console 100.

1. Message Processor

Figure 9:
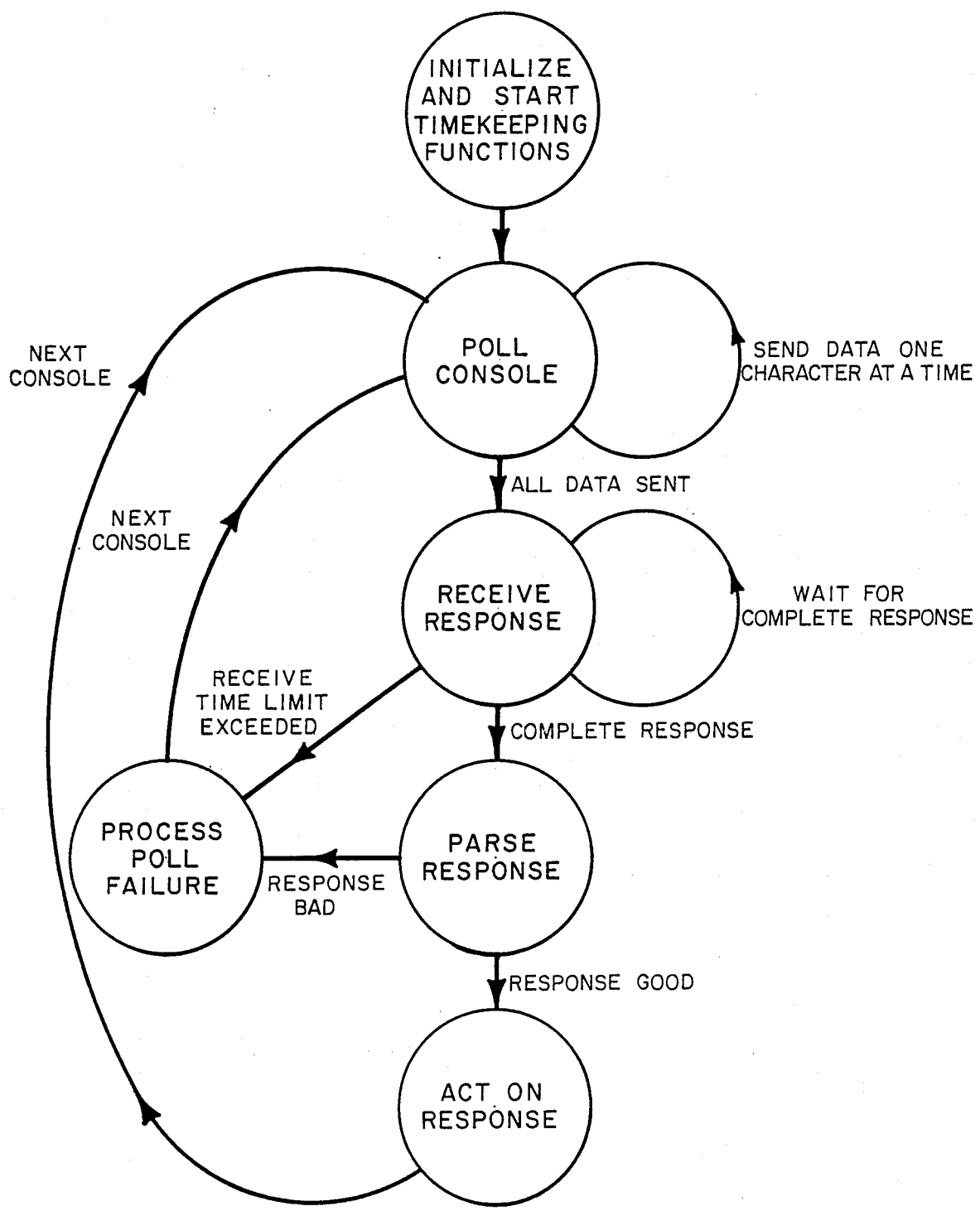
FIG. 9 is a schematic state diagram of the message processor of FIG. 2.
Figure 10:
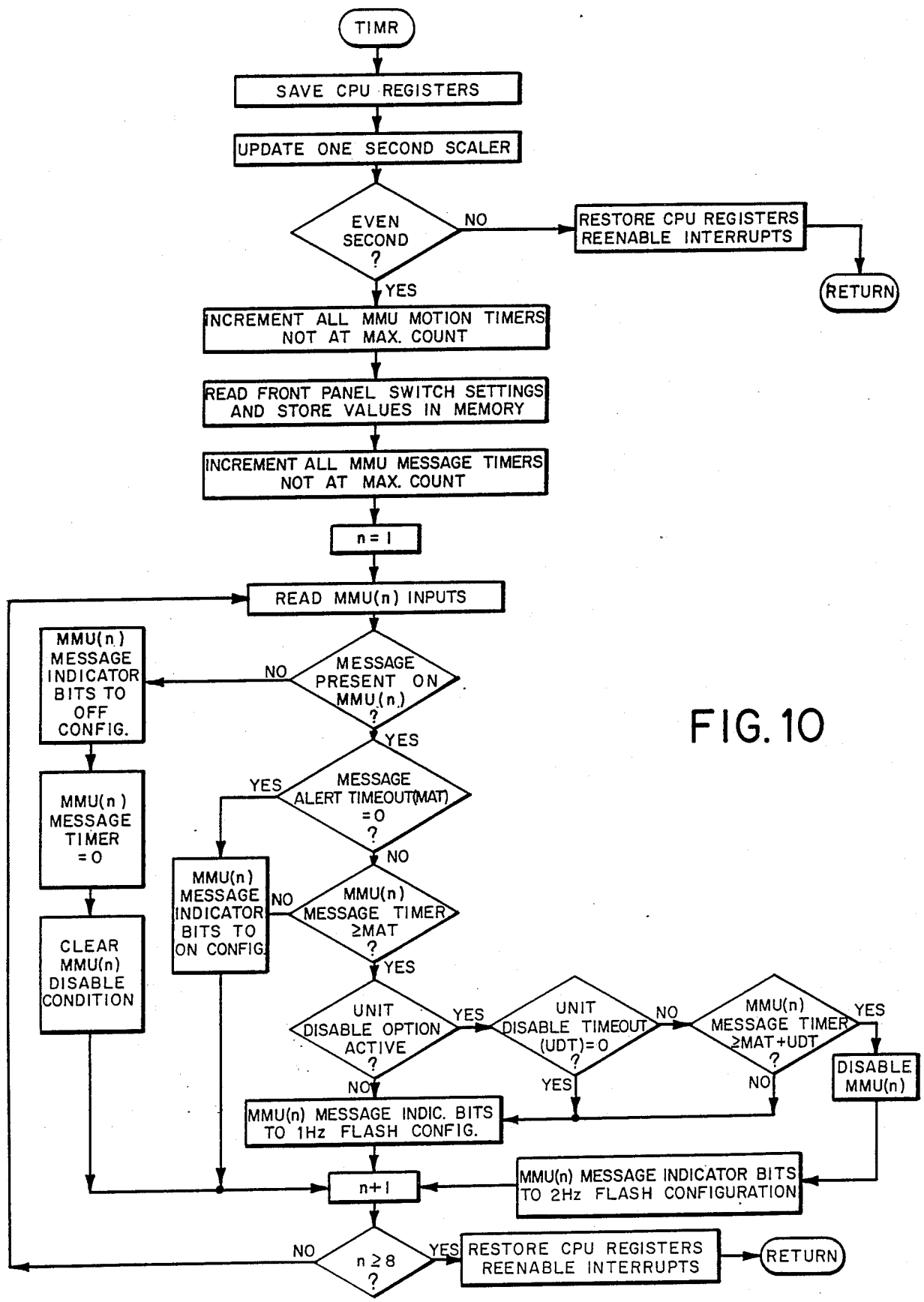
FIG. 10 is a flow chart of the Timer Interrupt subprogram included in the program of the message processor of FIG. 2.

FIG. 9 shows a general state diagram showing the overall flow of the program of the message processor 30. As shown in FIG. 9, this program begins with an initialization subprogram. After initialization has been completed, the message processor 30 then polls a selected one of the consoles 100. It does this by sending in serial fashion a six-byte message, each byte containing 8 bits. The first five bytes define the state of the various indicators and the adapter 120 included in the retrieval console 100, and the sixth byte is a check sum.

After all six bytes have been sent to the selected console, the message processor 30 then waits for a two-byte response. The first byte indicates any key entries on the retrieval console 100 and the second byte is a check sum. After the two-byte message has been received, the message processor then analyzes the response to determine whether the response was properly received and whether the check sum confirms the accuracy of the response. If either the complete message is not received in a predetermined time limit or the message is determined to be in error, the message processor recognizes a poll failure and advances to poll the next console. If, on the other hand, the received message from the console is considered accurate, the message processor acts on the response, as for example by initiating commanded movement of the associated MMU, and then advances to poll the next console.

In this way, each of the retrieval consoles 100 is polled in sequence and the message processor coordinates interconnections between the MMU's 26 and the retrieval consoles 100, as well as commands from the retrieval consoles 100 to the associated MMU's 26.

The program for the message processor 30 is divided into five subprograms. FIGS. 10–14e provide detailed flow charts for four of these five subprograms and the Polling Subroutine. Except for initialization, the entire message processor program is interrupt driven. The following discussion will deal with each of the five subprograms that make up the message processor software.

a. Power On Initialization

This subprogram is executed whenever power is applied to the message processor 30, or whenever the crash recovery circuit generates a reset on the system bus. This subprogram is entered under the control of the Master Controller Card 70 and is responsible for initialization of all hardware substantially as follows.

With respect to the CPU Card 80, interrupts are disabled, the interrupt mode is initialized, RAM is tested and cleared, and the stack pointer is set. With respect to the Master Controller Card 70, the UART is reset, disabled, and initialized, its receive buffer is cleared, the interrupt controller is initialized, and the programmable timer is set up with Counter 0 as a baud rate generator, Counter 1 as a receive character time limit, and Counter 2 as a system clock. With respect to the Console Interface Cards 50 and the Unit Interface Cards 40, all output ports are cleared. With respect to the Front Panel Board 60, the settings of the various switches 62,64,66,68 are read and stored in RAM. The timer interrupt of the Master Controller Card 70 is then enabled on the interrupt controller and CPU interrupts are enabled. Polling is then initiated starting with retrieval console No. 16. Finally, the CPU card 80 is started in an infinite wait loop.

b. Timer Interrupt

The second subprogram of the message processor 30 is the Timer Interrupt subprogram which is executed whenever the Master Controller Card 70 timer generates a 10 millisecond interrupt. The Timer Interrupt subprogram (as flow charted in FIG. 10) saves appropriate CPU registers, updates a one-second scaler, and then determines whether or not the scaler indicates an even second. If not, the routine restores CPU registers and returns. If the one-second scaler does indicate an even second, the subprogram then increments all MMU motion timers not at the maximum count. A separate motion timer is maintained for each of the MMU's 26 and is used to indicate the time the MMU has been in a given motion state (such as forward or reverse). Then the front panel switches on the Front Panel Board 60 are read and stored in RAM and all MMU message timers not at maximum count are incremented. The program maintains a separate MMU message timer for each of the MMU's 26. These timers basically store the elapsed time since the MESSAGE PRESENT input of the associated MMU 26 first indicated that a message was stored on the MMU 26, and are reset to zero each time the MESSAGE PRESENT input indicates that all stored messages have been transcribed. Then for each of the eight MMU's a subroutine is performed to determine whether the MMU should be disabled and to update time-out variables and indicators.

For each MMU, first the message present indicator is examined. If no message is present then the message indicator bits used to drive the indicator 164 are set to the off configuration, the appropriate message timer is set to zero, and any disabled condition is cleared. If, on the other hand, a message is present on the MMU of interest, the subroutine then checks to see whether the Message Alert Timeout switches 62 have been set equal to zero indicating that no timeout function is desired. If so, the bits controlling the message indicator 164 of the appropriate MMU 26 are set to the on configuration. If the Message Alert Timeout function is enabled, the subroutine then checks to see whether the message timer for the MMU of interest is greater than or equal to the Message Alert Timeout threshold set by the switches 62. If so, the subroutine then checks to see whether the rocker switch 68c has been used to disable the Unit Disable Option. If not, the subroutine checks to see whether the message timer is greater than or equal to the sum of the times entered by the two sets of switches 62,64. If so, the appropriate MMU 26 is disabled and the bits controlling the associated message indicator 164 are set to the 2 Hertz flash configuration. If not, these bits are set to the 1 Hertz flash configuration.

After the subroutine has been executed for all of the MMU's, the CPU registers are restored, interrupts are reenabled, and subprogram returns. The Timer Interrupt subprogram ensures that the message indicators 164 are properly controlled, and ensures that the MMU's 26 are disabled in the event that the corresponding MMU message timer exceeds the preset threshold.

c. Transmitter Empty Interrupt

Figure 11:
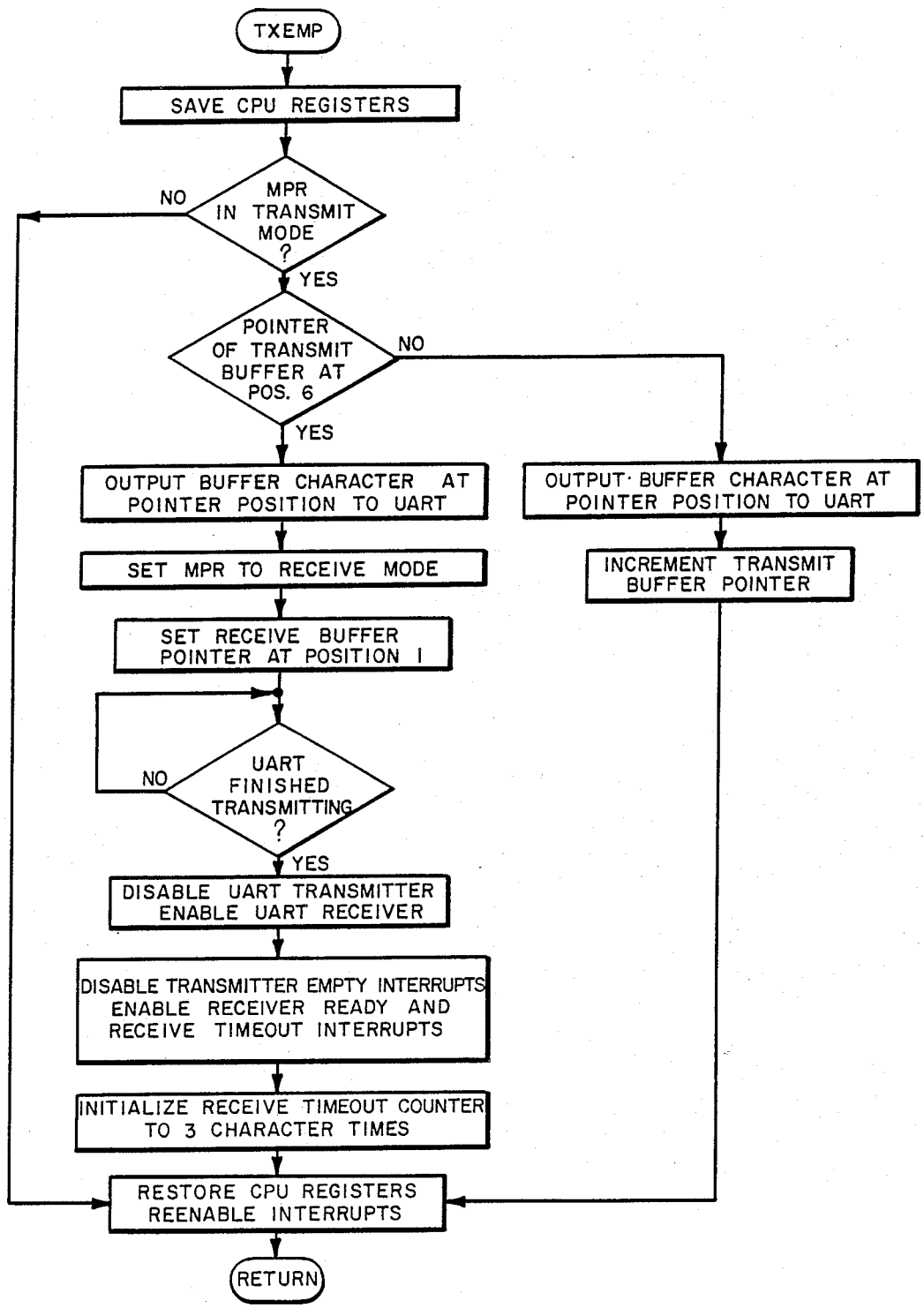
FIG. 11 is a flow chart of the Transmitter Empty Interrupt subprogram included in the message processor of FIG. 2.

The third subprogram included in the software of the message processor 30 is the Transmitter Empty Interrupt flowcharted in FIG. 11. This subprogram is executed whenever the UART of the Master Controller Card 70 generates a transmitter empty interrupt indicating that transmission of an 8 bit byte has just been completed. The Transmitter Empty Interrupt saves necessary CPU registers, and transmits a single 8-bit character from the transmit buffer to the UART. When all characters in the transmit buffer have been transmitted to the UART and therefore to the console, the UART receiver is reenabled and the receive time limit counter is initialized to timeout in about the time required to transmit 3 bytes Then appropriate CPU registers are restored and the interrupt system is reenabled before returning.

d. Receive Timeout Interrupt

Figure 12:
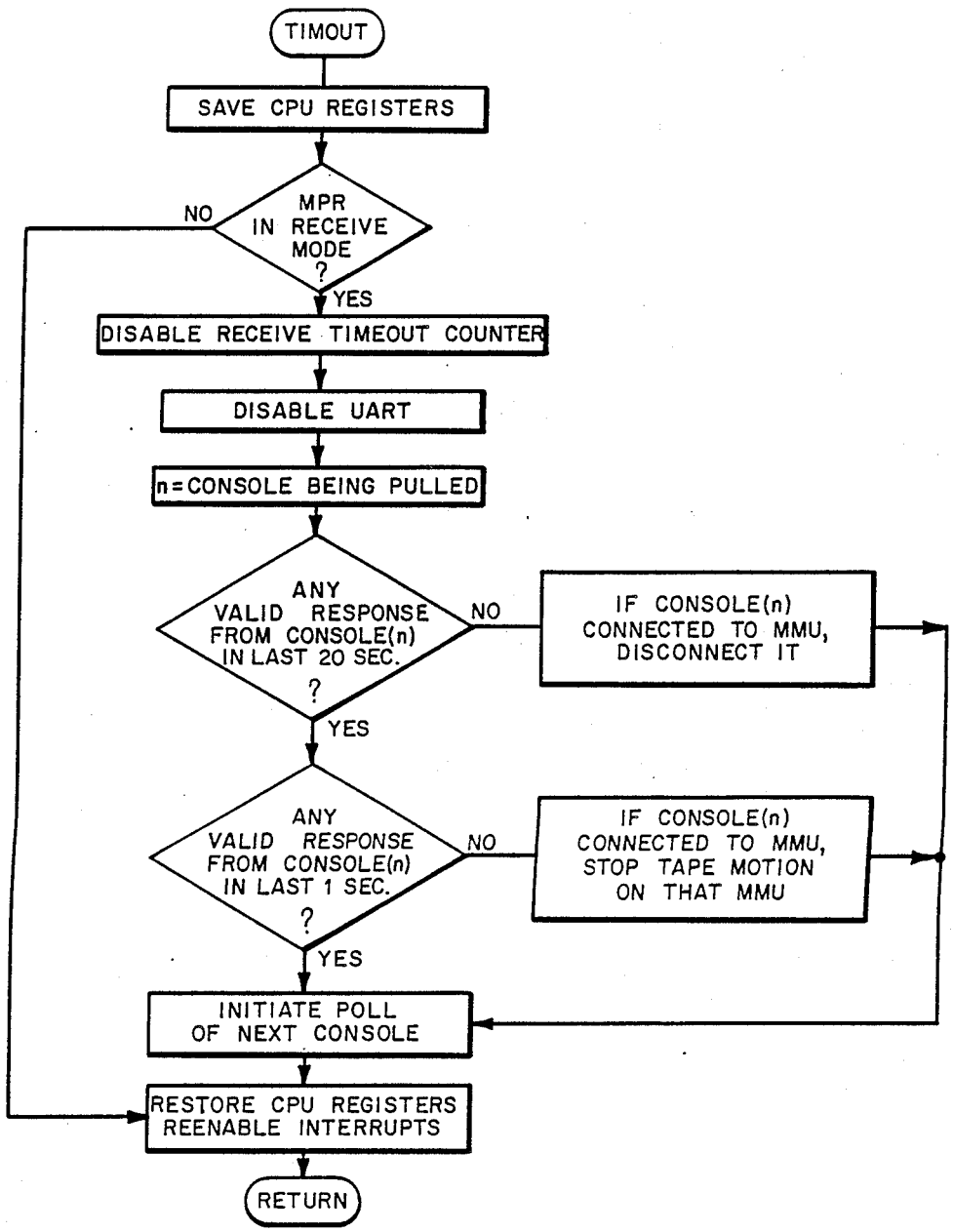
FIG. 12 is a flow chart of the Receive Timeout Interrupt subprogram included in the message processor of FIG. 2.
Figure 13:
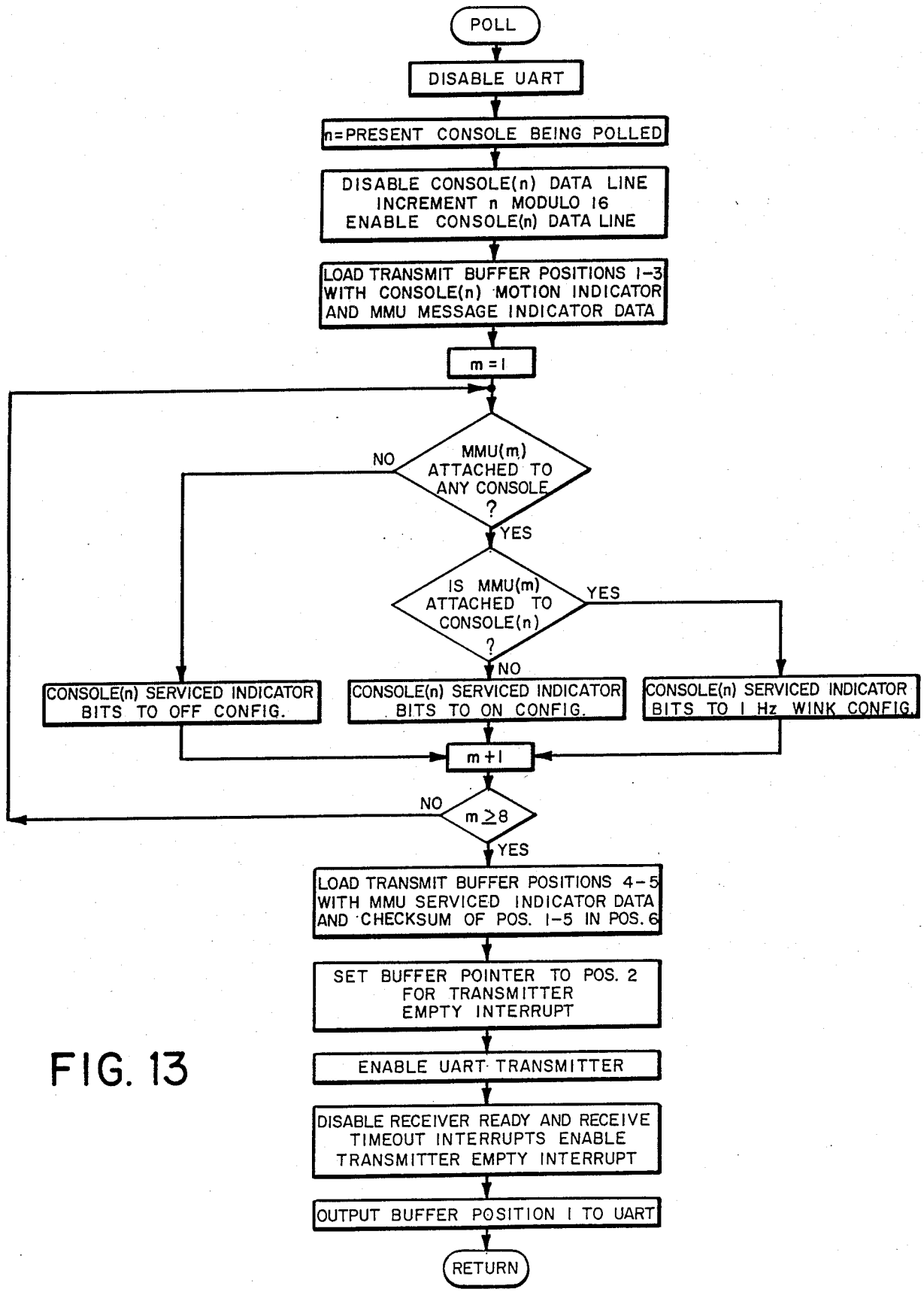
FIG. 13 is a flow chart of the Polling Subroutine called by subprograms such as the Receive Timeout Interrupt.

The fourth subprogram, entitled Receive Timeout Interrupt, is flowcharted in FIG. 12. It is executed whenever the Master Controller Card timer receive time limit counter generates an interrupt indicating that no characters have been received by the UART of the Master Controller Card 70 within the specified time interval. This subprogram saves whatever CPU registers are needed and then counts the number of consecutive times a retrieval console 100 has failed to respond to a poll. When this count exceeds a first threshold, the tape motion of any MMU connected to the nonresponding retrieval console 100 is stopped. When the count exceeds a second threshold, any connected MMU is disconnected from the nonresponding retrieval console 100. The UART of the Master Controller Card 70 is then placed in the transmit mode in order to initiate polling of the next retrieval console. Finally, appropriate CPU registers are restored and the interrupt system is reenabled before returning from the subprogram. FIG. 13 is a flow chart of the Polling Subroutine called by the Receiver Timeout Interrupt.

e. Receiver Ready Interrupt

The fifth subprogram included in the message processor software is entitled Receiver Ready Interrupt and is flow-charted in FIGS. 14a–14e. This subprogram is executed whenever the UART included in the Master Controller Card 70 receives an 8-bit character from one of the retrieval consoles 100. The Receiver Ready Interrupt subprogram waits until both bytes of a message from one of the retrieval consoles 100 is received and then examines the received message for UART errors and checksum errors. If for any reason the response from the retrieval console 100 is not satisfactory, the subprogram takes steps to ensure that any connected MMU is protected from a nonresponding console. In the event no valid response has been received from a console in the last 20 seconds, the console is disconnected from any previously connected MMU. In the event no valid response has been received from a console in that last 1 second, the subprogram operates to stop all tape motion on any MMU connected to that console. Then the poll of the next console is initiated, CPU registers are restored, the interrupt system is reenabled, and the program returns.

Figure 14A:
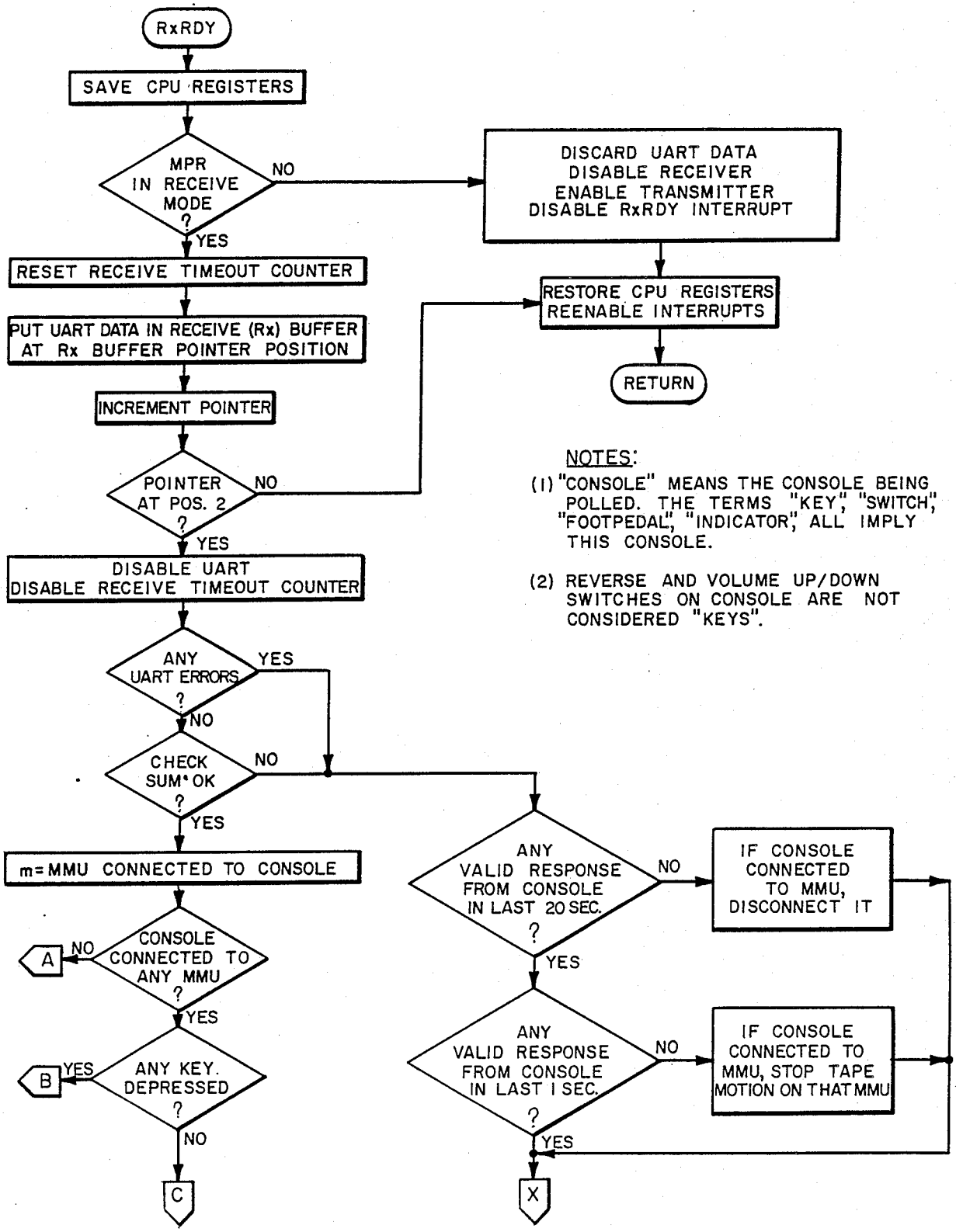
FIGS. 14a-14e together form a flow chart of the Receiver Ready Interrupt subprogram included in the program of the message processor of FIG. 2.
Figure 14B:
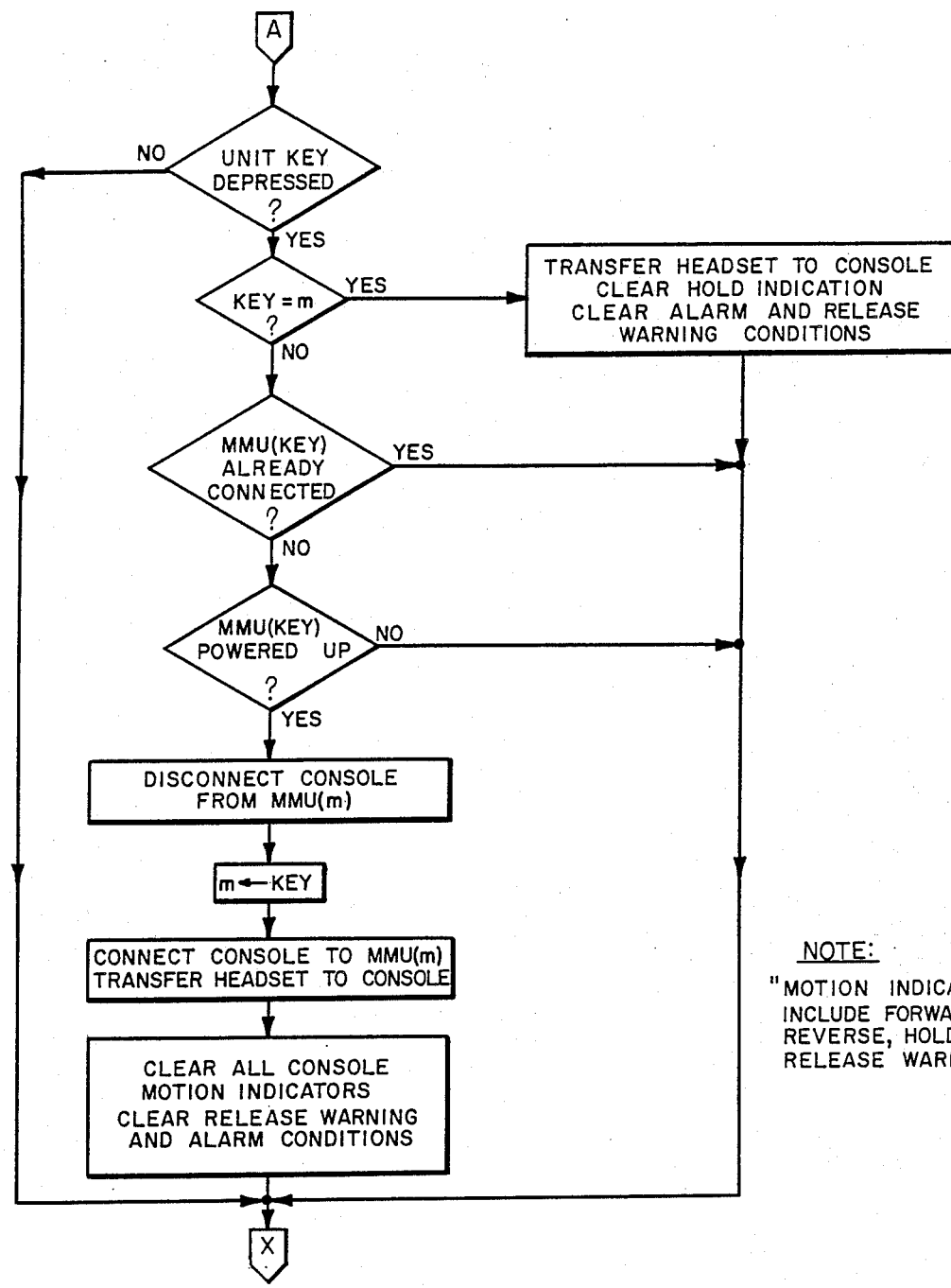

In the event a good response is received from the retrieval console being polled and that console is presently connected to any of the MMU's 26, the subroutine of FIG. 14b is executed. This subroutine checks to see whether one of the unit keys 158e is depressed. If not, the subroutine returns after restoring registers and reenabling the interrupt system. If so, the subroutine takes three actions depending on the status of the MMU designated by the depressed one of the unit keys 158e. If the depressed one of the unit keys 158e corresponds to any MMU currently connected to the console, then the headset adapter 120 is controlled to couple the headset to the line 124. The hold indication 168 is cleared, and any alarm and release warning conditions are cleared. If the depressed unit key 158e designates an MMU that is already connected to another one of the retrieval consoles 100, then no action is taken. Similarly, if the depressed one of the unit keys 158e corresponds to an MMU which is not powered up, no action is taken. However, if the depressed unit key indicates an MMU which is not connected to another console and which is powered up, the subroutine of FIG. 14b disconnects the console from any MMU to which it was previously connected and connects the console to the MMU corresponding to the depressed unit key. The headset adapter 120 is controlled to ensure that the headset receives audio signals from the connected MMU. Then all motion indicators and the release warning indicator are cleared, along with associated alarm conditions.

Figure 14C:
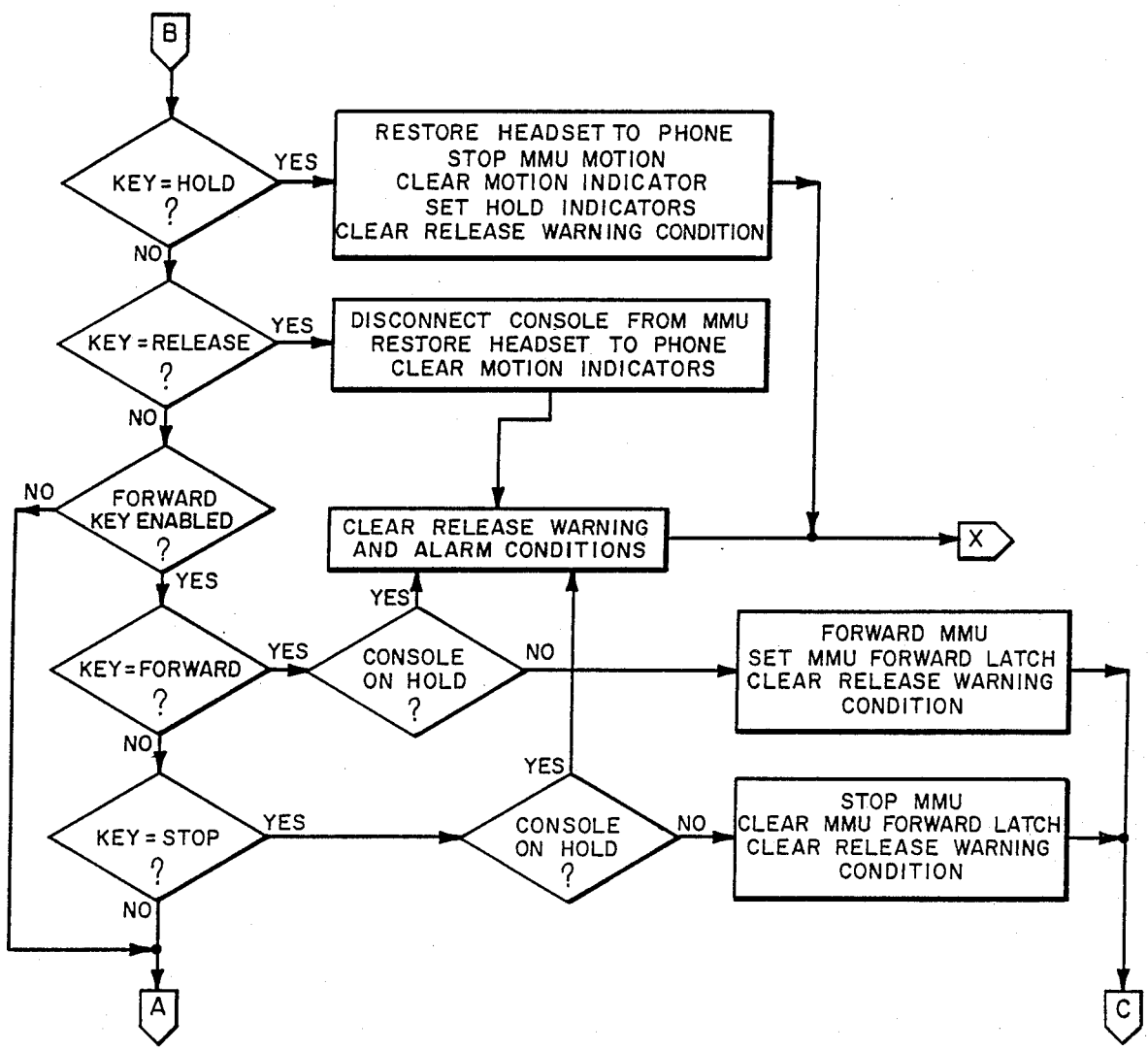

If the console being polled is connected to one of the MMU's and is indicating that a key has been depressed, then the subroutine of FIG. 14c is executed. This subroutine responds appropriately to the hold, release, forward, and stop keys as shown in FIG. 14c. If the subroutine of FIG. 14c recognizes that one of the above-mentioned keys has not been activated, it then transfers control to the subroutine of FIG. 14b described above.

Figure 14D:
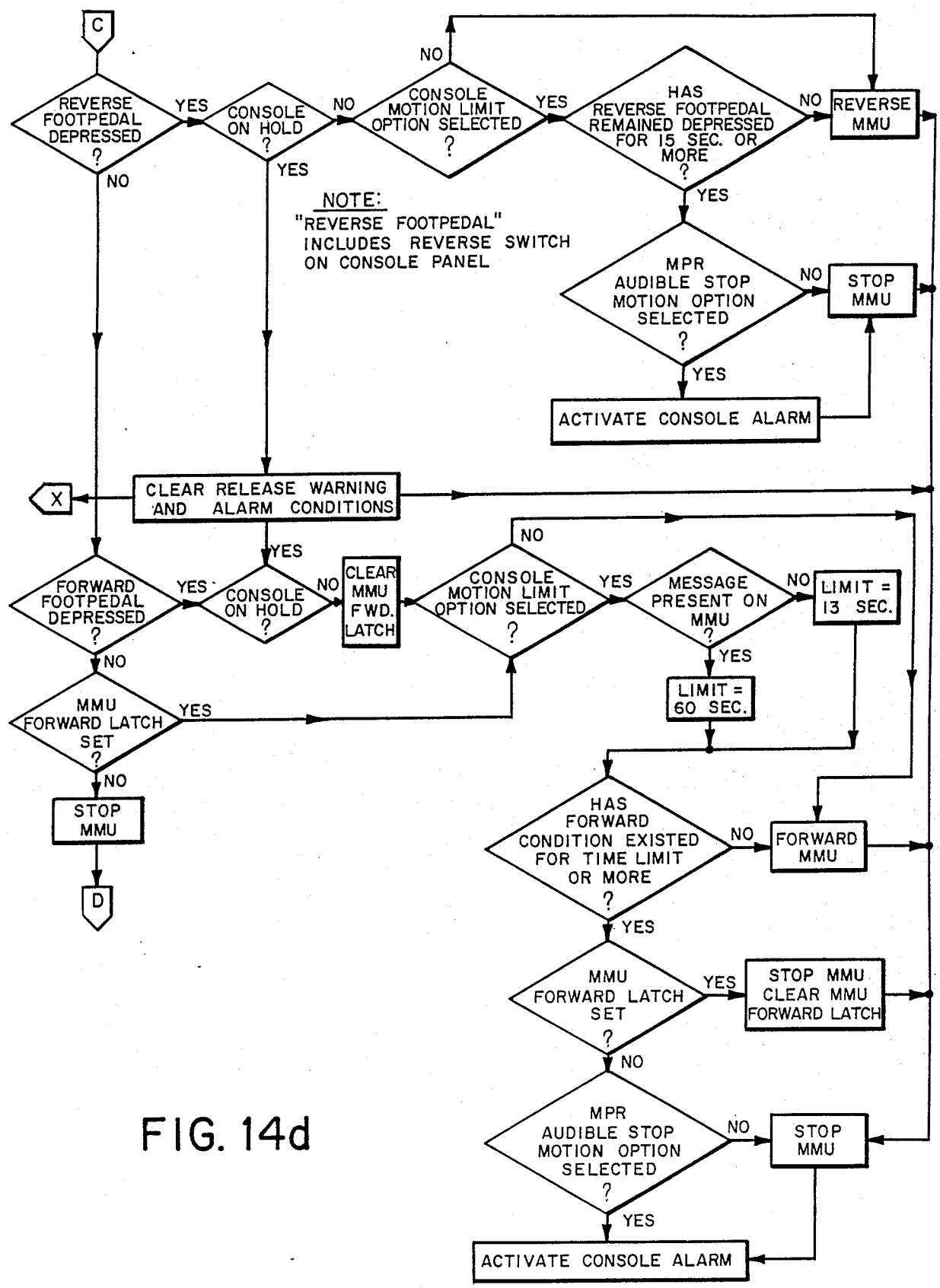

In the event the console being polled is connected to an MMU and either no key is depressed or the forward or stop keys are depressed and the console is not on hold, then the subroutine of FIG. 14d is executed. This subroutine responds to reverse or forward actuation of the foot pedal and, in addition, checks to ensure that forward or reverse tape motion of the commanded MMU does not exceed predetermined limits without multiple key or pedal activation. As shown in FIG. 14d, if reverse tape motion has been commanded and if the console motion limit option has been selected, then the subroutine checks to see whether a reverse command switch (either the foot pedal 110 or the reverse key 158b) has been depressed for more than 15 seconds. If not, reverse movement of the MMU is allowed to proceed; if so, the MMU is stopped and the console audible alarm is activated if the audible alarm option has been selected.

Similarly, if forward motion of the MMU has been commanded and the console motion limit option selected, the subroutine of FIG. 14d selects a threshold depending upon whether a message is present upon the connected MMU. If not, the time limit is set equal to 13 seconds of tape travel. In this way the time limit is set to a shorter value during playback of a terminal portion of a last recorded message on the connected MMU. If so, the time limit is set equal to 60 seconds of tape travel. The subroutine then checks to see whether the forward tape motion has persisted for a time period greater than the selected time limit. If not, forward tape motion of the MMU is allowed to proceed. However, if the appropriate threshold has been exceeded, the MMU is stopped and the audible console alarm is activated if that option has been selected.

Figure 14E:
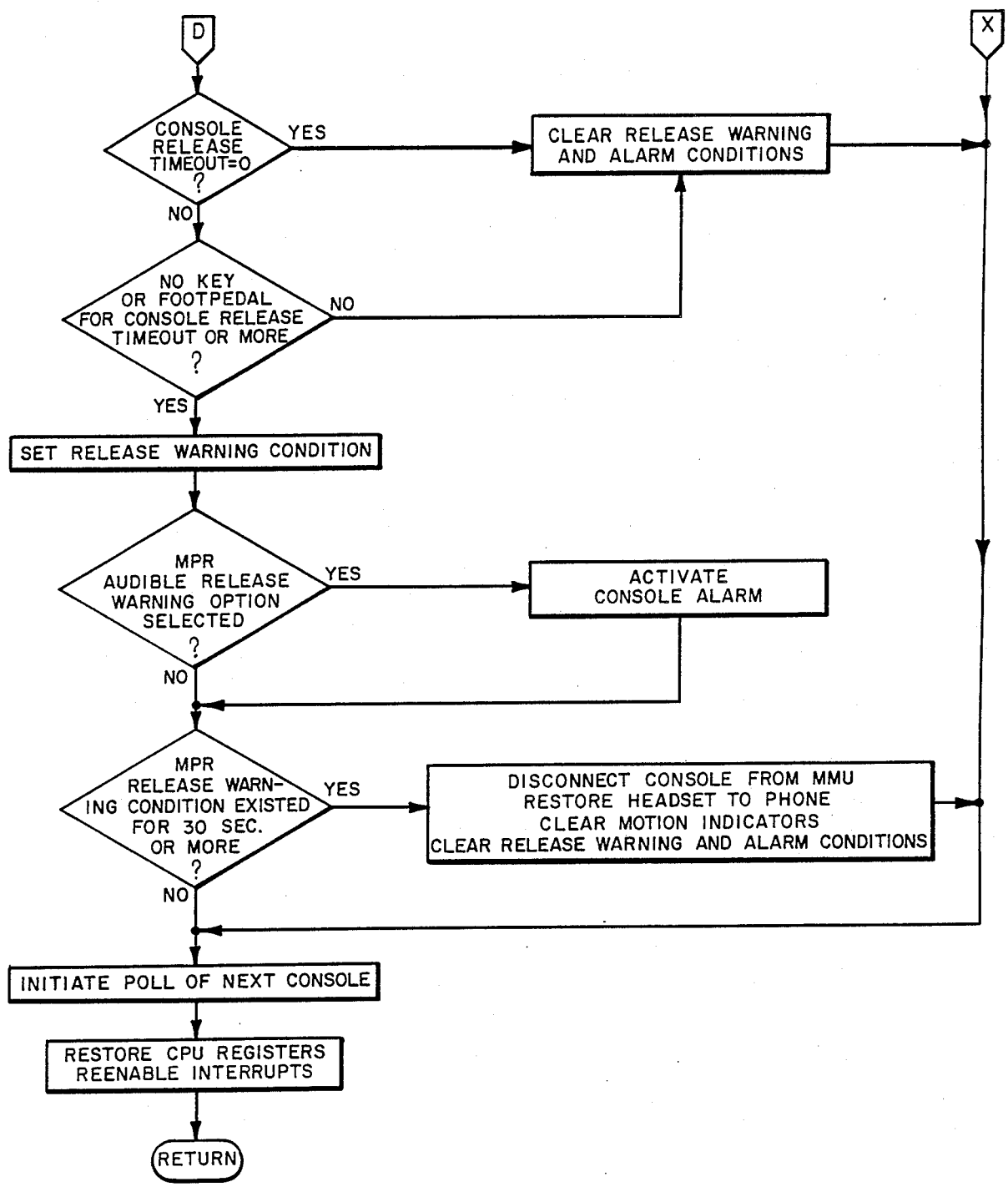

If the subroutine of FIG. 14d does not detect activation of the foot pedal 110 or the reverse switch on the console panel, and if the forward latch is not set, then the associated MMU is stopped and the subroutine of FIG. 14e is executed.

The subroutine of FIG. 14e checks to see if a key or foot pedal on the console being polled has been activated within the time limit set by the Console Release Timeout switches 66. If not, a release warning condition is set which will cause the activation of the release warning indicator 168e. If the audible release warning option has been selected, the audible console alarm is activate. Furthermore, if the warning condition has existed for 30 seconds or more, the subroutine disconnects the console being polled from the previously connected MMU, then sets data bits which will cause the headset adapter 120 to connect the telephone headset 135 with the phone instrument 130. The poll of the next console is then initiated.

2. Retrieval Console

The program of the retrieval console 100 is divided into five subprograms consisting of an initialization program, a foreground subprogram, and three interrupt routines.

a. Power On Initialization

This subprogram is executed whenever power is applied to the retrieval console 100 or the crash recovery circuit generates a processor reset. This subprogram disables all interrupts; tests and clears the RAM; sets the stack pointer; initializes the RIOT; clears the I/O ports and sets the timer mode; resets and disables the UART, initializes its mode and clears its receive buffer; clears the keyboard interface; initializes and enables the processor interrupts; and then jumps to the foreground subprogram.

b. Foreground Subprogram

The foreground subprogram monitors a software Receive Time limit counter which determines when a transmission from the message processor 30 is incomplete. If the timer expires, the partial message is scrubbed. In addition, this subprogram supervises the transmission of data to the message processor 30 when instructed to do so by the Receive Character Interrupt. Finally, this subprogram places the UART in the receive mode when the response to the message processor 30 has been transmitted, so that the UART is ready to receive another transmission from the message processor 30.

c. Receive Character Interrupt

This subprogram is executed whenever the UART receives a character from the message processor 30 and the UART receiver has been previously enabled. This routine saves whatever CPU registers will be needed, resets the Receive Time Limit counter to prevent the foreground subprogram from scrubbing the message, assembles the message as each character is received from the message processor, and verifies the message after it has been completed. Once the message has been verified the console indicator state table is updated based on the received message. Then the current state of the footpedal switches are read and the console switch state table is updated. The transmitting buffer for the console's response to the message processor is then set up and flagged for the foreground subprogram to transmit it. CPU registers are restored, the interrupt system is re-enabled and the subprogram returns.

d. Timer Interrupt

This subprogram is executed whenever the RIOT's timer generates a 50 millisecond interrupt. This routine save necessary CPU registers, increments the frequency count and updates variables used to flash the indicators, and updates the indicators based on the current values in the indicator state table as adjusted by the Receive Character Interrupt. The volume control switches 158g, 158h are then read and the volume control 156 and volume display 162 are updated. Finally, CPU registers are restored, the interrupt system is re-enabled, and the routine returns.

e. Keyboard Interrupt

This program is executed whenever a key is pressed on the console switch panel 158 causing the keyboard interface 159 to generate an interrupt. This routine saves whatever CPUs are necessary, reads the key value from the keyboard interface, formats it, and merges it into the current console switch state table, and then restores CPU registers, re-enables the interrupt system, and returns.

3. Console Message Processor Communications Protocol

The retrieval consoles 100 and the message processor 30 communicate by passing relevant information back and forth in serial form. The message processor 30 sends a selected one of the consoles 100, the indicator state information needed by the console, and the console 100 responds by sending to the message processor 30 the current console switch state information.

The message processor 30 sends a 6 byte message in each transmission to a retrieval console 100, and each byte is 8 bits in length. The first byte indicates the commanded state of the Hold, Reverse, Stop, Forward and Release Warning indicators 168a through 168e as well as the audible alarm 170 and the state of the headset adaptor 120. The second and third bytes of the message provide information needed to control the message indicators 164. Together, these two bytes indicate which of the following four states each the message indicators 164 is in: On, Off, Slow Flash (1 Hertz, 50% duty cycle), Fast Flash (2 Hertz, 50% duty cycle). Similarly, the fourth and fifth bytes of the message indicate which of four states each of the serviced indicator 166 is in, as follows: On, Off, Slow Flash (1 Hertz, 90% duty cycle), Fast Flash (2 Hertz, 50% duty cycle). The 6th byte of the message is check sum for the previous 5 bytes.

Responses from the retrieval consoles 100 to the message processor 30 are 2-byte messages in which the first byte corresponds to the console switch state and the second byte is a check sum which in this embodiment is equal to the first byte. The four least significant bits of the byte correspond to a key code which identifies the last key of the switch panel 158 pressed, the next two bits indicate forward and reverse foot pedal closures, and the two most significant bits are unused.

It is entirely possible that no console is attached to a particular communications line or that a console is disabled. The message processor 30 is programmed to wait 3 character times for a response. If no response is received during that period, it will time out, scrub any spurious message that may have been received, and proceed to the next console.

4. Function Definitions

The foregoing discussion of the operation of the message retrieval system 20 is summarized and complemented by the function definitions of Table I. The abbreviations used in Table I correspond to abbreviations used else where in this specification.

TABLE I

| Name | Abbrev. | Definition |
|---|---|---|
| Message Waiting | MW | Solid indication on all Consoles for each MMU with untranscribed messages. |
| Message Alert | MA | 1 Hz (50% duty cycle) flashing Message indicator when MW condition present for more than "Message Alert" timeout. Cleared by transcribing all messages. |
| Out of Tape | OT | 2 Hz (50% duty cycle) flashing Message indicator when MMU is filled to capacity. |
| Unit Disable | UD | 2 Hz (50% duty cycle) flashing Message indicator when MA condition present for more than "Unit Disable" timeout, if this feature is enabled. Also, particular unit is disabled from taking more calls. Cleared by transcribing all messages. |
| Unit Serviced | USV | Solid indication on all Consoles for each MMU connected to another Console. |
| Unit Commanded | UC | 1 Hz (90% duty cycle) flashing Serviced indicator for MMU which this Console is commanding |
| Release Warning | RW | 2 Hz (50% duty cycle) flashing indication and optional audible alarm on commanding Console when no activity for greater than "Console Release" timeout. Alarm volume user controllable. Cleared by F, FS, S, R, US, UR, or UH. When on Hold, same except US must be for Unit commanded. If RW persists for 30 sec., Console is released from MMU |
| Release Warning Audible | RWA | Setting in MPR to enable audible Release Warning alarm. |
| Stop Motion | SM | Solid indication and optional audible alarm on Console when motion command exceeds limit. Cleared by motion release, UR, or US. Feature enabled by Console circuit board jumper. Alarm volume user controllable. |
| Stop Motion Audible | SMA | Setting in MPR to enable audible Stop Motion alarm. |
| Message Alert Timeout | MAT | Setting in MPR to cause MA condition. Range: 1 min. to 99 hrs. 99 mins. Zero setting disables feature. |
| Console Release Timeout | CRT | Setting in MPR to cause RW condition on commanding Console. Range: 1 min. to 99 mins. Zero setting disables feature. |
| Unit Disable Timeout | UDT | Setting in MPR to cause UD condition. Range: 1 min. to 99 hrs. 99 mins. Zero setting disables feature. |
| Unit Disable Override | UDO | Setting in MPR to override UD feature. |

TABLE I-continued

| Name | Abbrev. | Definition |
|---|---|---|
| Unit Select | US | Console command to request connection to particular MMU. Releases any previous connection to this Console. Acts within 250 ms. Transfers telephone headset to transcription. |
| Unit Release | UR | Console command to release connection to any MMU. Acts within 250 ms. Returns telephone headset to phone instrument. |
| Forward | F | Console footpedal command to cause forward tape motion. Acts within 125 ms. Accompanied by solid indication on Console. Momentarily overrideable by R. Motion ceases automatically if footpedal not released in forward motion limit |
| Forward Start | FS | Console pushbutton command to initiate continuous forward tape motion up to forward motion limit. Accompanied by same indication as F. Momentarily overrideable by R. Timer reset by FS or R. Command cancelled by S, F, or UH. Feature enabled by internal Console jumper. |
| Stop | S | Console pushbutton, command to stop tape motion initiated by FS. |
| Reverse | R | Console footpedal or pushbutton command to cause reverse tape motion. Acts within 125 ms. Accompanied by solid indication on Console. |
| Unit Hold | UH | Console comand to switch telephone headset back to phone instrument and disable tape motion. Cancels FS command. Accompanied by solid indication on Console. Released by US for commanded unit or UR. Motion commands F, FS, S, and R entered in this mode, as well as UH itself, clear the RW condition. |
| Headset Transfer | HT | Command from MPR to switch operator headset over to MMU audio. Released by UR and UH. |
| Audible Alarm | AA | Command from MPR to activate audible alarm in Console. Alarm is a one second simple tone every 5 seconds. |
| Volume Control | VC | Internal Console commands to raise and lower transcribe audio volume in 1 db steps over a 32 db range at 20 db/sec. Act as long as held. Accompanied by 8-segment bar graph display, one bar per 4 db. Display lit only when unit selected and not on hold. |

C.
APPENDICES

The appendix to this specification includes Appendices A1–A7 which provide additional information with regard to the hardware of the message retrieval system 20 and Appendices B1 and B2 which provide program listings for the message processor and the retrieval console. Table II describes the contents of each of these appendices.

TABLE II

| APPENDIX | DESCRIPTION |
|---|---|
| A1 | Schematic diagram of Unit Interface Card 40. |
| A2 | Schematic diagram of Console Interface Card 50. |
| A3 | Schematic diagram of Front Panel Board 60. |
| A4 | Schematic diagram of Master Controller Card 70. |
| A5 | Schematic diagram of Message Processor 30. |
| A6 | Schematic diagram of retrieval console 100. |
| A7 | Table of principal components for A1–A6 |
| B1 | Listing of Message Processor program. |
| B2 | Listing of Retrieval Console program. |

In general, in the event of inconsistency, the appendices are to control over the drawings and the discussion, and the drawings are to control over the discussion.

D.

OPERATION

The base units 24 and the MMU's 26 operate to record telephone messages in the conventional manner. The retrieval consoles 100 are used by an operator to control playback and rewinding of the message memory units 26 and to request interconnection with any one of the message memory units 26. In addition, the retrieval consoles 100 provide considerable information as to the status of the message memory units.

With regard to this information provided by the retrieval console 100, the message processor 30 responds to the presence of untranscribed messages on one of the MMU's by activating the red message indicators 164 for that MMU on all of the consoles 100. If the MESSAGE PRESENT input for an MMU has indicated the presence of recorded messages for more than the Message Alert Timeout set on the Front Panel Board 60, the message indicator 164 will flash at 1 Hz until all messages are cleared. If such an alert has been present for more than the Unit Disable Timeout set on the Front Panel Board 60, the message indicator 164 will flash at 2 Hz and the MMU 26 and the associated base unit 24 will be prevented from taking further calls until all messages are transcribed from the MMU 26. Also, whenever an MMU 26 is filled to capacity, the associated message indicator 164 will flash at 2 Hz. Both the message alert and unit disable features can be defeated by setting the associated switches on the Front Panel Board 60 to zero. For convenience, the unit disable feature may also be defeated by the unit disable override switch 168c on the Front Panel Board 60.

In order to transcribe messages stored on one of the MMU's 26, the operator presses the appropriate unit button 158e and if no other console is servicing that MMU the message processor 30 connects the console to the MMU. The serviced indicator 166 (green) for that MMU is then illuminated on all consoles. At the console to which the MMU is connected (the commanding console) the respective serviced indicator 166 flashes at 1 Hz (90% duty cycle). Tape motion may now be controlled by the operator by pressing the forward and reverse foot pedal controls or switches which are signalled by matching indicators on the console. Recorded messages from the MMU may be heard through the telephone headset or handset 135, or a conventional transcription headset or earpiece. The operator sets the preferred volume by pressing the volume control switches 158g, 158h, which raise or lower the volume as long as they are depressed. The volume control switches 158g, 158h scan the full range of 32 digital steps in about 1.5 seconds. The commanded volume is shown as a bar graph on the display 162. Eight segments are provided, one for every four volume steps. The volume display 162 is activated only when an MMU is selected and not on hold. When finished with one MMU, the operator can press the unit release switch 158f or select another MMU via one of the unit switches 158e.

The operator's control of tape motion is subject to constraints imposed by the message processor 30. The forward and reverse foot pedal controls and the reverse switch 158b act only as long as they are held. The forward switch 158d is enabled by an internal jumper in the console 100 and it initiates forward motion which continues until the stop switch 158c is depressed or until the forward limit has elapsed as explained below.

In addition, a tape motion limiting feature is enabled by an internal jumper option in the console 100. With this option selected, continuous forward motion is limited to 60 seconds if the message indicator 164 for the commanded MMU is activated and 13 seconds if it is not. Similarly, continuous reverse motion is limited to 15 seconds. If any of these limits is exceeded or tape motion on the associated MMU is stopped, the commanding console is controlled to activate the stop indicator 168c and to sound an optional audible alarm 170 until the control is released. The audible alarm for this feature is enabled by the option switch 68b on the Front Panel Board 60. In this embodiment tape speed in reverse is four times that of tape speed in forward, and thus, the limits for forward and reverse motion are identical. The MMU's of this embodiment reset the MESSAGE PRESENT input during transcription of a last recorded meassage while the last 13 seconds of transcription of the last recorded message is completed, and this causes the associated message indicator to be turned off during the last 13 seconds of transcription of the last recorded message. The 13-second limit is for these situations in which the message indicator is not activated, and it allows an operator to transcribe the last 13 seconds of tape between the recording and transcription heads without inadvertently playing back excessive tape and thereby losing part of a next recorded message.

In addition, the reverse foot pedal or the reverse switch 158b momentarily overrides the forward switch 158d. The forward foot pedal cancels the forward switch 158d. To resolve contradictory simultaneous inputs, tape motion command priority is (1) reverse, (2) forward foot pedal, (3) forward switch.

if a commanding console does not issue a tape motion command in a time equal to the Console Release Timeout set on the Front Panel Board 60, the release warning indicator 168e is caused to flash at 2 Hz and an optional audible alarm is sounded until a motion command for the unit selected is received. If 30 seconds of a warning condition elapses, the message processor 30 disconnects the previously connected MMU from the commanding console and this MMU is then made available to other consoles. The feature is defeatable by setting the Console Release Timeout switches to zero on the Front Panel Board 60. The audible alarm for this feature is enabled by the switch 168a on the Front Panel Board 60. The audible alarm in the embodiment is a one-second simple tone repeated every 5 seconds. The alarm transducer 170 at each console is enabled by an internal jumper, and its volume is adjustable by an externally accessible control.

The phone headset of handset 135 when used for transcription is automatically switched to transcribe when a unit select switch 158e is pressed. If the operator desires to take a call live, the phone headset 135 can be connected to the telephone instrument 130 by pressing the hold switch 158a. The phone headset 135 is returned to the transcription mode by pressing the appropriate unit select switch 158e again. The hold indicator 168a is activated as long as the MMU is on hold. Even though forward and reverse commands to not cause tape motion when the console is in the hold mode, they still act to clear a release warning condition. The forward switch command 158d is cancelled by the unit hold command 158a.

All commands and indications are transmitted over a serial data link between the message processor 30 and the consoles 100 at 19,200 bits per second. In the event of a communications line failure between a console 100 and the message processor 30, tape motion on the MMU commanded by that console will cease within 1 second of the failure. Furthermore, if the line remains dead for 20 seconds, the MMU will be disconnected and made available to other consoles.

Both the message processor 30 and the consoles 100 include circuitry to recover from random or spurious crashes. The run indicators on both units report on the condition of the electronics: a steady indictor implies that power is present and that the program is running, a flashing indicator indicates that power is present but the device is permanently crashed, and no indicator implies no power. A crash of one of the consoles 100 will only alter the volume setting. A crash of the message processor 30 will stop all tape motion, release all consoles, and reset all accumulated time to zero. Operators should then reselect the MMU's 26 they were working on and continue as before.

From the foregoing, it should be apparent that a message retrieval system has been described which provides important advantages. A single speaker such a headset or a handset is used by the operator both the transcribe recorded messages and to conduct live telephone conversations. The speaker is automatically switched in mode to correspond to the mode of the retrieval console. In addition, the message processor insures that a commanded MMU remains linked to a console even when the MMU is placed on hold and the console is used for live telephone conversations. This feature of the system allows an operator to interrupt transcription to conduct a live telephone conversation and then to return to the interrupted transcription.

In order to insure that a console does not monopolize an MMU, the processor automatically disconnects a commanded MMU from its console in the event the console has not commanded the MMU within a preset time period. The processor also controls a warning on the console prior to disconnecting the console from the MMU in order to allow an operator to take action to preserve a connection.

Yet another feature of this invention is that action is automatically taken in the event recorded messages on the MMU's age excessively prior to transcription. In the preferred embodiment described above this action is to disable the MMU from recording further messages until all previously recorded messages have been transcribed. In alternate embodiments, the system may take other action, such as changing the prerecorded message of the base unit to indicate a longer callback time to the telephone callers, or automatically interconnecting additional retrieval consoles to speed message transcription.

Moreover, the system described above automatically controls playback and rewind motion of the MMUs to substantially prevent an operator from inadvertently playing back or reversing tape motion for an excessive period of time without continuous activity.

Each of these features and advantages can be used separately and independently of the others. However, the preferred embodiment described above is particularly efficient in that it provides all of these advantages.

Of course, it should be understood that a wide range of changes and modifications to the preferred embodiment described above will be apparent to those skilled in the art. For example, the message processor may monitor other parameters than the MESSAGE PRESENT input from an MMU in order to gauge the age of recorded messages. The time a message is recorded can be recorded on an MMU along with the message, and the message processor can use this recorded time to perform the functions described above. U.S. Pat. No. 4,338,494 discloses hardware suitable for use in such an alternate embodiment.

In addition, this invention is not limited to use with base units and message memory units of the type described above. For example, this invention can readily be adapted for use with a computer control telephone answering and message recording system in which both the messages played back to callers and the recorded caller messages from multiple telephone lines are recorded in a single computer memory system. As used herein, the term "message memory unit" is intended in its broad sense to encompass any storage medium for recorded messages, including secluded locations, in such a computer memory system. Similarly, as used herein, the term "telephone answering machine" is intended in its broad sense to cover any mechanism for answering a ringing telephone line, including a mechanism controlled by a central computer.

Furthermore, the number of MMU's or retrieval consoles can be varied as needed to suit the individual application. Furthermore, other hardware approaches and other programs can be used to implement the functions described above. It is therefore intended that the foregoing detailed description be regarded as illustrative rather than limiting, and that it be understood that it is the following claims, including all equivalents, which are intended to define the scope of this invention.

We claim:

1. In a message retrieval system of the type comprising a plurality of telephone answering machines and a plurality of message memory units coupled to the answering machines, each of the message memory units including means for storing a plurality of messages, the improvement comprising:

at least one retrieval console coupled to the message memory units to permit an operator at the retrieval console to audit messages stored on the message memory units, said retrieval console comprising at least one forward switch operative to generate a playback command to cause a selected one of the message memory units to playback a stored message in a forward direction;

means for preventing a single activation of the forward switch from causing the selected one of the message memory units from playing back a stored message for more than a first preselected time interval; and means, responsive to a subsequent activation of the forward switch, for causing the selected one of the message memory units to resume playback of any remaining portion of said stored message.

2. The invention of claim 1 wherein the retrieval console further comprises at least one reverse switch operative to generate a rewind command to cause said selected one of the message memory units to rewind a stored message in a reverse direction, and wherein the invention further comprises means for preventing a single activation of the reverse switch from causing the selected one of the message memory units from rewinding for more than a second preselected time interval.

3. The invention of claim 2 wherein the invention further comprises:

means for setting the first preselected time interval to a first value during playback of a terminal portion of a last recorded message on the selected one of the message memory units, and to a second value, longer than the first value, during other playback conditions.

* * * * *

UNITED STATES PATENT AND TRADEMARK OFFICE
CERTIFICATE OF CORRECTION

PATENT NO.  : 4,856,050
DATED       : August 8, 1989
INVENTOR(S) : Peter F. Theis et al.

It is certified that error appears in the above-identified patent and that said Letters Patent is hereby corrected as shown below:

In column 4, line 48, please delete "per se" and substitute therefor --*per se*--.

In column 11, line 45, please delete "activate" and substitute therefor --activated--.

In column 14, line 9 of Table I under the heading "Definition", please delete "Mes" and substitute therefor --Mes- --.

In column 14, line 24 of Table I under the heading "Definition", after "commanding" please insert --.--.

In column 15, line 17 of Table I under the heading "Definition", after "limit" please insert --.--.

In column 16, line 6 of Table II under the heading "Description", after "A1-A6" please insert --.--.

In column 17, line 59, after "can" please insert --then-.

In column 18, line 34, please delete "if" and substitute therefor --If--.

In column 18, line 43, please delete "The" and substitute therefor --This--.

UNITED STATES PATENT AND TRADEMARK OFFICE
CERTIFICATE OF CORRECTION

PATENT NO. : 4,856,050

DATED : August 8, 1989

INVENTOR(S) : Peter F. Theis et al.

Page 2 of 2

It is certified that error appears in the above-identified patent and that said Letters Patent is hereby corrected as shown below:

In column 18, line 47, please delete "the" and substitute therefor --this--.

In column 18, line 52, please delete "of" and substitute therefor --or--.

In column 19, line 10, please delete "indictor" and substitute therefor --indicator--.

In column 19, line 23, please delete the second occurrence of "the" and substitute therefor --to--.

Signed and Sealed this

Twenty-eighth Day of July, 1992

Attest:

DOUGLAS B. COMER

*Attesting Officer*  *Acting Commissioner of Patents and Trademarks*